US008676649B2

(12) United States Patent
Wiesinger et al.

(10) Patent No.: US 8,676,649 B2
(45) Date of Patent: Mar. 18, 2014

(54) SYSTEMS AND METHODS TO MERCHANDISE A PRODUCT BASED ON A COMPATIBILITY

(75) Inventors: Guenter Wiesinger, Landau (DE); Jennifer Chang, San Francisco, CA (US); Enoch Chen, San Jose, CA (US); Kristine Chin Aronson, Mountain View, CA (US); Famous Rhodes, San Jose, CA (US)

(73) Assignee: eBay, Inc., San Jose, CA (US)

( * ) Notice: Subject to any disclaimer, the term of this patent is extended or adjusted under 35 U.S.C. 154(b) by 634 days.

(21) Appl. No.: 12/875,937

(22) Filed: Sep. 3, 2010

(65) Prior Publication Data

US 2012/0059723 A1 Mar. 8, 2012

(51) Int. Cl.
  *G06Q 30/00* (2012.01)
(52) U.S. Cl.
  USPC .................. 705/14.66; 705/26.7; 705/26.8
(58) Field of Classification Search
  USPC ............... 705/14.66, 26.7, 26.8; 707/999.01
  See application file for complete search history.

(56) References Cited

U.S. PATENT DOCUMENTS

| 6,549,906 | B1 * | 4/2003 | Austin et al. ........................ 1/1 |
| 7,505,921 | B1 * | 3/2009 | Lukas et al. ................. 705/26.5 |
| 2005/0187834 | A1 * | 8/2005 | Painter et al. .................. 705/28 |

* cited by examiner

*Primary Examiner* — Donald L. Champagne
(74) *Attorney, Agent, or Firm* — Schwegman, Lundberg & Woessner, P.A.

(57) ABSTRACT

Methods and systems to merchandise a product based on compatibility are disclosed. The system receives a request over a network from a user. Next, the system associates the request with a user profile that is associated with the user, retrieves an application listing from the user profile that describes a first item and associates the first item with a plurality of candidate items based on item cluster information that is generated based on content data information that is received from a content data provider. Next, the system selects a second item from the plurality of candidate items, the second item being a component of the first item. Finally, the system communicates the merchandising information over a network, to merchandize the second item.

20 Claims, 19 Drawing Sheets

FIG. 1A
INFORMATION ENTERED BY SELLER
TO LIST PART FOR SALE    6
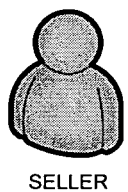
SELLER
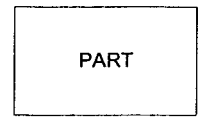
PART
FIG. 1B
INFORMATION ENTERED BY BUYER    8
TO QUERY FOR LISTINGS
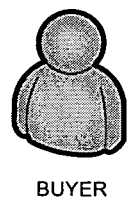
BUYER
PART    APPLICATION

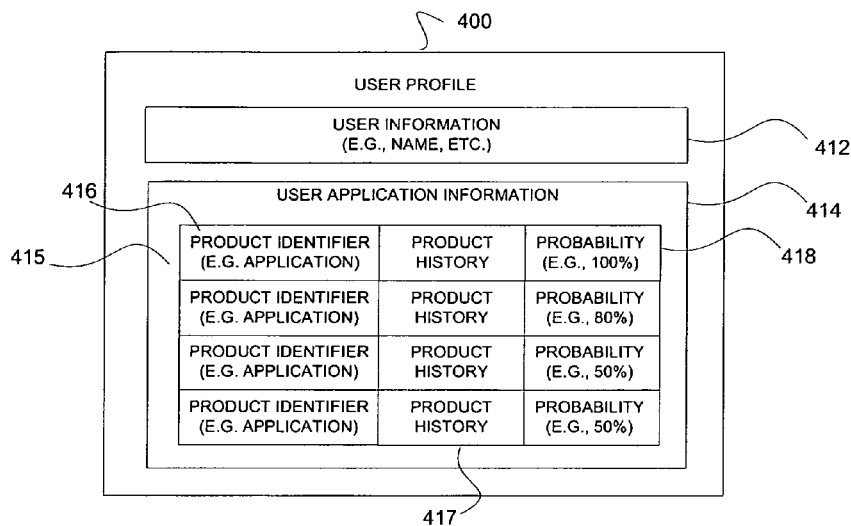
FIG.7A
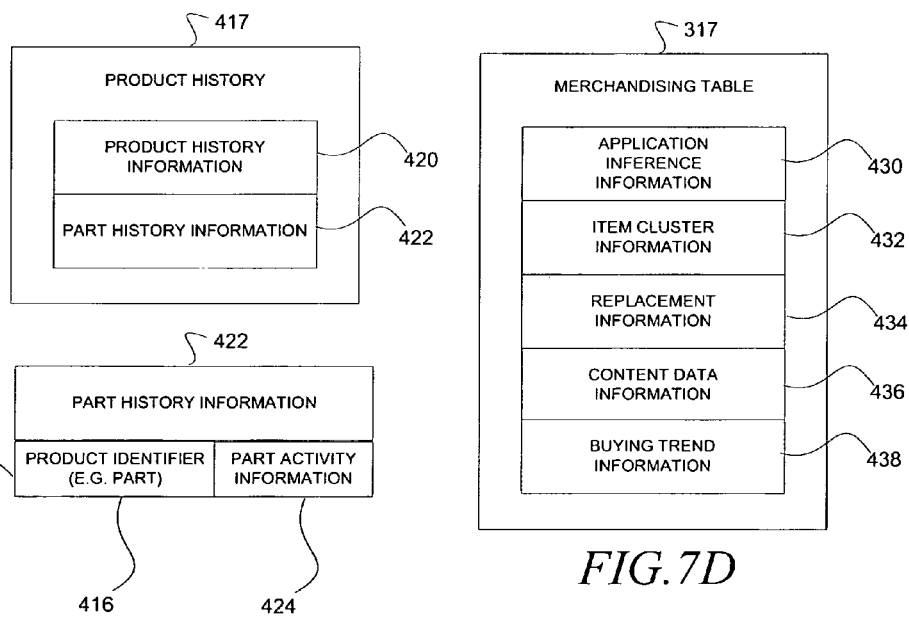
FIG.7B
FIG.7C
FIG.7D

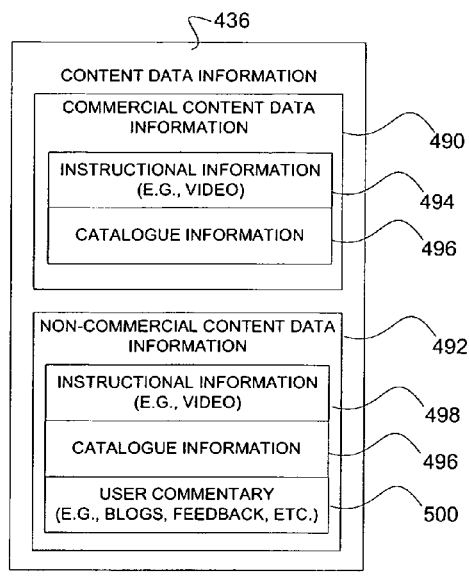
*FIG.10A*
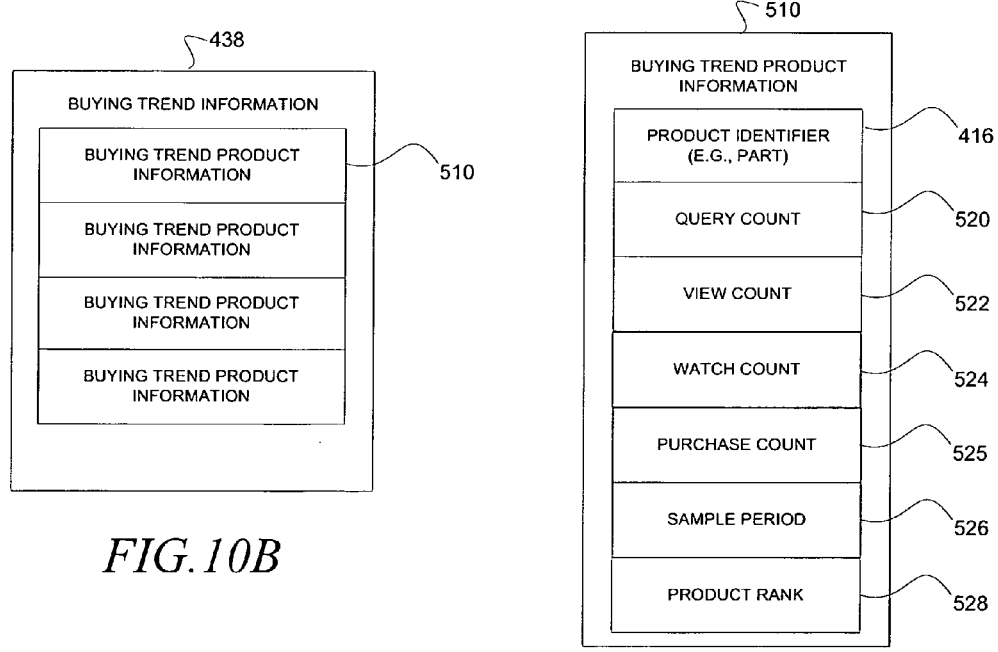
*FIG.10B*
*FIG.10C*

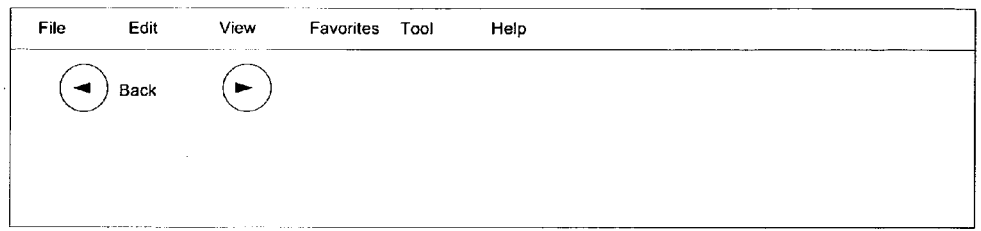
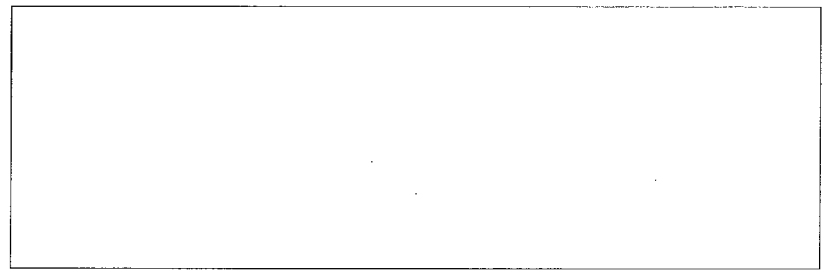
WE RECOMMEND....
PRINTER
XYZ
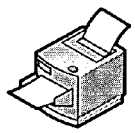
COMPATIBLE
WITH
DELL
LATITUDE D620
FAX
123
COMPATIBLE
WITH
APPLE
IMAC 4
SCANNER
M14
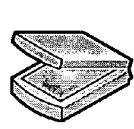
COMPATIBLE
WITH
HP
COMPAQ 6000
*FIG. 17*

SYSTEMS AND METHODS TO MERCHANDISE A PRODUCT BASED ON A COMPATIBILITY

TECHNICAL FIELD

This disclosure relates to the technical field of data communications and, more particularly, to systems and methods to merchandise a product based on compatibility.

RELATED ART

Merchandising may sometimes influence a user of a network-based marketplace to purchase a product. If the products selected for merchandising are not carefully selected, the merchandising effort may not be successful.

BRIEF DESCRIPTION OF THE DRAWINGS

Embodiments are illustrated by way of example and not limitation in the figures of the accompanying drawings, in which:

FIG. 1A is a block diagram illustrating information entered by a seller, according to an embodiment, to list a part for sale;

FIG. 1B is a block diagram illustrating information entered by a buyer, according to an embodiment, to query for listings;

FIG. 7A is a block diagram illustrating a user profile, according to an embodiment;

FIG. 7B is a block diagram illustrating a product history, according to an embodiment;

FIG. 7C is a block diagram illustrating part history information, according to an embodiment;

FIG. 7D is a block diagram illustrating a merchandising table, according to an embodiment;

FIG. 10A is a block diagram illustrating content data information, according to an embodiment;

FIG. 10B is a block diagram illustrating buying trend information, according to an embodiment;

FIG. 10C is a block diagram illustrating buying trend product information, according to an embodiment;

FIGS. 16-18 are diagrams illustrating various user interfaces, according to an embodiment.

DETAILED DESCRIPTION

In the following description, for purposes of explanation, numerous specific details are set forth in order to provide a thorough understanding of some example embodiments. It will be evident, however, to one of ordinary skill in the art that embodiments of the present invention may be practiced without these specific details.

As described further below, according to various example embodiments of the disclosed subject matter described and claimed herein, systems and methods to merchandise a product based on compatibility are described. Various embodiments are described below in connection with the figures provided herein.

The example embodiments described herein seek to optimize an opportunity to merchandise by selecting products (e.g., items) to display based on compatibility. Items may be parts or components that have an assembly (e.g., parts that fit an application). While many of the example embodiments are discussed in the context of determining compatibility of automotive parts with particular vehicles, it will be appreciated that the methods and systems described herein may be applied to a broad range of compatibility use scenarios (e.g., parts for computers, printers, photo cameras, washing machines, lawn mowers, scooters, buildings, doors, tractors, solar panels, bikes, airplanes, aircrafts, motorcycles, boats, or any other application that may be assembled with parts). Further, it will be appreciated that the methods and systems described herein may be applied to a broad range of technical problems, some of which are described as follows.

FIG. 1A is a block diagram illustrating information 6 entered by a seller to list a part for sale on an electronic marketplace. Consider a seller that desires to sell a part on an electronic marketplace. Typically the seller provides information describing the part. For example, the seller may describe a set of brake pads by providing a title and description. Alternatively, the seller may select a catalogue entry or product listing that corresponds with the part from a catalogue of items that is maintained by the electronic marketplace.

FIG. 1B is a block diagram illustrating information 8 entered by a buyer to find listings of parts. Consider a buyer that desires to acquire a part on an electronic marketplace. Typically the buyer provides information describing the part.

In some instances, the buyer may provide or select an application the part is compatible with. For example, the seller may query "brake pads Toyota Tacoma Truck," or navigate a tree-like hierarchically organized category structure to select "brake pads" for a Toyota Tacoma Truck.

Figure 2:
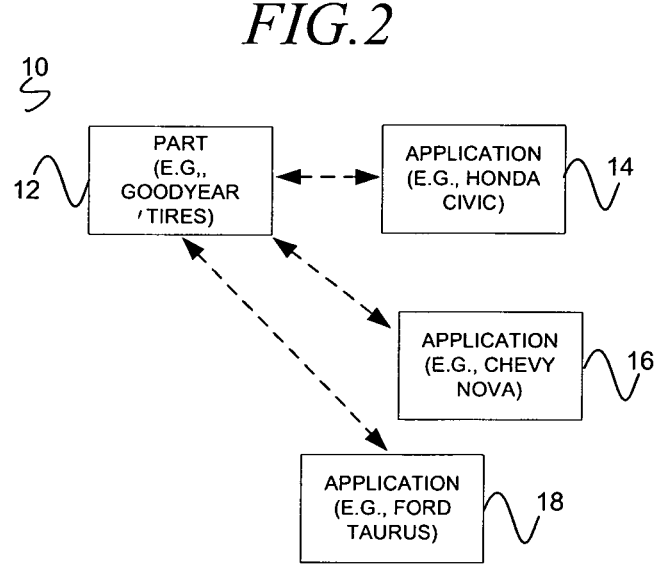
FIG. 2 is a block diagram illustrating a relationship, according to an embodiment, between a part and applications.

FIG. 2 is a block diagram illustrating a relationship 10, according to an embodiment, between a part 12 and one or more applications 14, 16, and 18. In the present context, an application may be any entity an item (e.g., part) is compatible with such that the part "fits" the entity. For example, an item may be an alternator and the alternator may fit an entity such as a Toyota Tacoma truck. Accordingly, the relationship 10 may be described as a "fits a" relationship 10 because the part 12 or item may be said to fit one or more of the applications 14, 16, and 18. Indeed, the part 12 may further be said to be compatible with the applications 14, 16, and 18. For example, the part 12 in the form of "GOODYEAR TIRES" may fit or be compatible with applications 14, 16, 18 in the form of a "HONDA CIVIC," "CHEVY NOVA," or a "FORD TAURUS." In contrast, other applications may not exhibit this relationship 10 with the part 12. Also in the present context, an application may be any entity an item is compatible with such that the item may be utilized in conjunction with the application. For example, the part 12 may be embodied as a specialized wrench may be utilized to mount a set of tires on an application 14, as previously described. Also for example, the part 12 may be embodied as a lubricant that may be utilized to lubricate the application 14.

Aspects of the Present Disclosure

According to a first aspect of the present disclosure, systems and methods to merchandise a product based on compatibility are described. In one embodiment a system may receive a request from a user and associate the request with a user profile. The user profile may include one or more applications that were previously associated with the user. For example, an application may include a vehicle, a computer, a photo camera, an appliance or any other device that may be assembled from compatible parts (e.g., components). In some embodiments the notion of compatibility may extend beyond assembly to include tools for assembly of the application (e.g., wrench, specialized screw driver, etc.), products for maintenance of the application (e.g., printer cartridges, cleaners, lubricants, etc.), manuals pertaining to the application or some other category that may include parts that are in some way compatible with the application. The application may have been previously associated with the user and stored in the user profile based on activities performed by the user. Further, the activity may have explicitly or implicitly identified the application. For example, a purchase activity may explicitly identify a strong association of the application with the user because the purchase implies the user has taken possession of the application. Examples of other activities may include a query activity, a view activity and a watch activity that are respectively related to a particular application. Next, the system may associate the application with items (e.g., parts) that are compatible with the application based on item cluster information to generate a set of candidate items. For example, an item cluster service may receive a product identifier identifying the application, and based on the item cluster information, return product identifiers for items (e.g., parts) that are compatible with the application. The item cluster information may be generated based on content data information that is received from a third party server (e.g., content data provider). For example, the content data provider may communicate catalogue information (e.g., catalogue) or instructional information (e.g., instructional video) that may be utilized to identify items (e.g., parts) that are compatible with the application. Next, the system may select one or more items (e.g., parts) from the candidate items to generate merchandising information that is communicated over a network to the user that entered the request. Accordingly, systems and methods to merchandise a product based on compatibility with an application that is associated with a user are described more fully below.

According to a second aspect of the present disclosure, systems and methods to merchandise a product based on a likelihood of associating an application with a user are discussed. In one embodiment the system may receive a request from a user and associate the request with a user profile. The user profile may include one or more applications with corresponding probabilities. The application and probabilities may have been previously identified and stored in the user profile based on activities performed by the user. Each activity may be associated with a single item (e.g., part) that is compatible with multiple applications. Accordingly, the applications may be assigned probabilities that measure a likelihood of association of the respective applications with the user. For example, a user may purchase tires (e.g., standardized product) that are known to be compatible with two applications, namely, an Audi A1 and a Volkswagen Golf Accordingly, product identifiers for the Audi A1 and the Volkswagen Golf applications may be stored in the user profile along with respective probabilities of 50% and 50% because the applications are, by inference of the purchase, equally associated with the user. Returning to the request, the system may respond to the request by retrieving a predetermined number of applications from the user profile. The applications may be identified for retrieval based on the probabilities mentioned above. For example, the system may retrieve applications with the highest probability of association up to a predetermined maximum number of applications. Next, the system may associate the respective applications with sets of items (e.g., parts) and select one item (e.g., parts) for each of the retrieved applications to generate merchandising information. Finally, the merchandising information may be communicated over a network to the user that entered the request. In some embodiments the probabilities may be updated based on subsequent activities performed by the user. For example, the user may purchase another item that is solely compatible with the Audi A1 application and not the Volkswagen Golf application. In this instance the probability for the Audi A1 may be updated from 50% to 100% and the probability for the Volkswagen Golf may be updated from 50% to 0%. Accordingly, systems and methods to merchandise a product based on a likelihood of association with a user are described more fully below.

Figure 3:
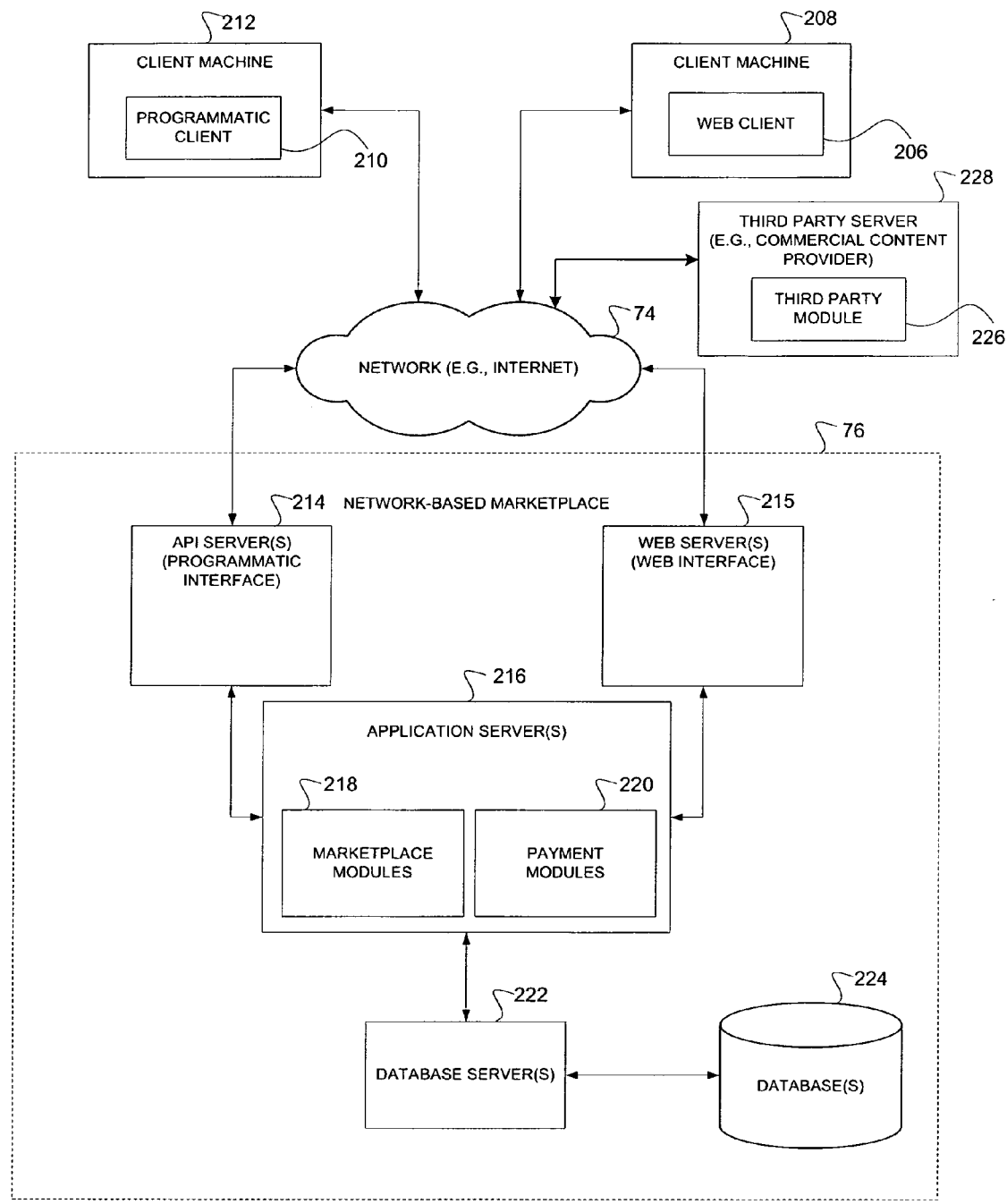
FIG. 3 is a block diagram illustrating a system, according to an embodiment, to merchandise a product based on a compatibility.

FIG. 3 is a network diagram depicting a networked system 200, within which one example embodiment may be deployed. A network-based marketplace 76 provides server-side functionality, via a network 74 (e.g., the Internet or Wide Area Network (WAN)) to one or more clients. FIG. 3 illustrates, for example, a web client 206 (e.g., a browser, such as the Internet Explorer browser developed by Microsoft Corporation of Redmond, Wash.) executing on a client machine 208 and a programmatic client 210 executing on client machine 212.

An application program interface (API) server 214 and a web server 215 are coupled to, and provide programmatic and web interfaces respectively to, one or more application servers 216. The application servers 216 host one or more marketplace modules 218 and payment modules 220. The application servers 216 are, in turn, shown to be coupled to one or more database servers 222 that facilitate access to one or more databases 224.

The marketplace modules 218 may provide a number of marketplace functions and services to users that access the network-based marketplace 76. The payment modules 220 may likewise provide a number of payment services and functions to users. The payment modules 220 may allow users to accumulate value in accounts and then to later redeem the accumulated value for products (e.g., goods or services) that are made available via the marketplace modules 218. Value may be accumulated in a commercial currency, such as the U.S. dollar, or a proprietary currency, such as "points." While the marketplace modules 218 and payment modules 220 are shown in FIG. 3 to both form part of the network-based marketplace 76, it will be appreciated that, in alternative embodiments, the payment modules 220 may form part of a payment service that is separate and distinct from the network-based marketplace 76.

Further, while the networked system 200 shown in FIG. 3 employs a client-server architecture, embodiments of the present invention are of course not limited to such an architecture and could equally well find application in a distributed, or peer-to-peer, architecture system, for example. The various marketplace modules 218 and payment modules 220 could also be implemented as standalone software programs, which do not necessarily have networking capabilities.

The web client 206 and programmatic client 210 access the various marketplace modules 218 and payment modules 220 via the web interface supported by the web server 215. Similarly, the programmatic client 210 accesses the various services and functions provided by the marketplace modules 218 and payment modules 220 via the programmatic interface provided by the API server 214. The programmatic client 210 may, for example, be a seller module (e.g., the TurboLister application developed by eBay Inc., of San Jose, Calif.) to enable sellers to author and manage listings on the network-based marketplace 76 in an off-line manner, and to perform batch-mode communications between the programmatic client 210 and the network-based marketplace 76.

FIG. 3 also illustrates a third party module 226, executing on a third party server 228, as having programmatic access to the networked system 200 via the programmatic interface provided by the API server 214. For example, the third party module 226 may support one or more features or functions on a website hosted by the third party. The third party website may, for example, provide commercial content to marketplace that is supported by the relevant modules of the networked system 200.

Marketplace and Payment Modules

Figure 4:
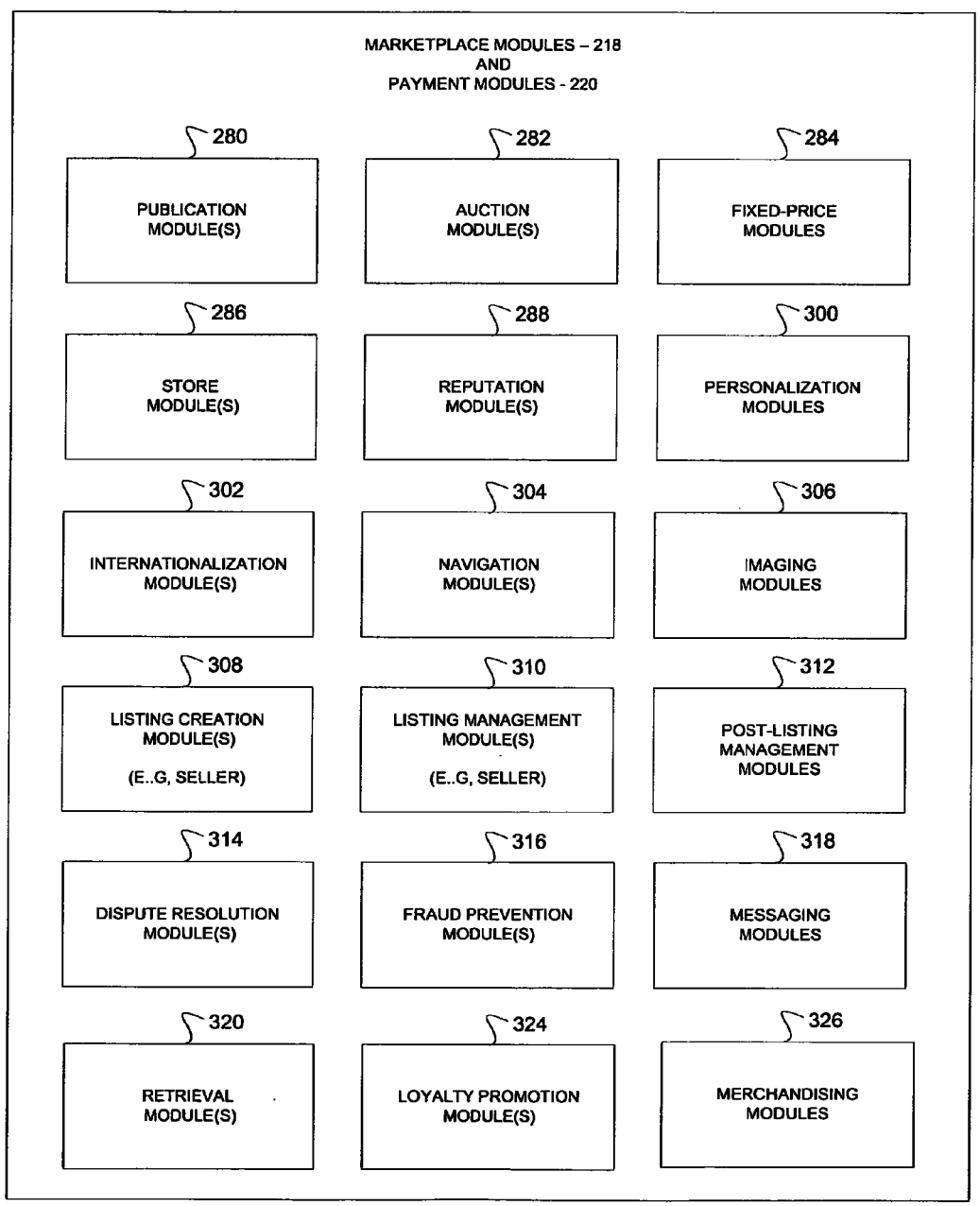
FIG. 4 is a block diagram illustrating marketplace modules and payment modules, according to an embodiment.

FIG. 4 is a block diagram illustrating marketplace modules 218 and payment modules 220 (e.g., software applications) that, in one example embodiment, are provided as part of the networked system 200 of FIG. 3. The marketplace modules 218 and payment modules 220 may be hosted on dedicated or shared server machines, as shown in FIG. 3, that are communicatively coupled to enable communications between server machines. The modules themselves are communicatively coupled (e.g., via appropriate interfaces) to each other and to various data sources, so as to allow information to be passed between the modules or so as to allow the modules to share and access common data. The modules may furthermore access one or more databases 224 via the database servers 222, as shown in FIG. 3.

The network-based marketplace 76 may provide a number of publishing, listing and price-setting mechanisms whereby a seller may list (or publish information concerning) goods or services for sale; a buyer can express interest in or indicate a desire to purchase such goods or services; and a price can be set for a transaction pertaining to the goods or services. To this end, the marketplace and payment modules 218 and 220 are shown to include at least one publication module 280 and one or more auction module(s) 282 which support auction-format listing and price setting mechanisms (e.g., English, Dutch, Vickrey, Chinese, Double, Reverse auctions, etc.). The various auction modules 282 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price modules 284 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed-price that is typically higher than the starting price of the auction.

Store modules(s) 286 may allow a seller to group listings within a "virtual" store, which may be branded and otherwise personalized by and for the seller. Such a virtual store may also offer promotions, incentives and features that are specific and personalized to a relevant seller.

Reputation module(s) 288 may allow users that transact, utilizing the network-based marketplace 76, to establish, build and maintain reputations, which may be made available and published to potential trading partners. Consider, for example, that where the network-based marketplace 76 supports person-to-person trading, users may otherwise have no history or other reference information whereby the trustworthiness and credibility of potential trading partners may be assessed. The reputation module(s) 288 allow a user to establish a reputation within the network-based marketplace 76 over time, for example, through feedback provided by other transaction partners. Other potential trading partners may then reference such a reputation for the purposes of assessing credibility and trustworthiness.

Personalization modules 300 may allow users of the network-based marketplace 76 to personalize various aspects of their interactions with the network-based marketplace 76. For example a user may, utilizing appropriate personalization modules 300, create a personalized reference page at which information regarding transactions to which the user is (or has been) a party may be viewed. Further, the personalization modules 300 may enable a user to personalize listings and other aspects of their interactions with the networked system 200 and other parties.

The networked system 200 may support a number of marketplaces that are customized, for example, for specific geographic regions. A version of the networked system 200 may be customized for the United Kingdom, whereas another version of the networked system 200 may be customized for the United States. Some of these versions may operate as an independent marketplace, or may be customized (or internationalized) presentations of a common underlying marketplace. The networked system 200 may accordingly include a number of internationalization modules 302 that customize information (and/or the presentation of information) by the networked system 200 according to predetermined criteria (e.g., geographic, demographic or marketplace criteria). For example, the internationalization modules 302 may be used to support the customization of information for a number of regional websites that are operated by the networked system 200.

Navigation of the network-based marketplace 76 may be facilitated by one or more navigation modules 304. For example, browse modules may allow users to browse various category, catalogue, or inventory data structures according to which listings may be classified within the networked system 200. Various other navigation modules 304 may be provided to supplement the search and browsing modules.

In order to make listings available via the networked system 200 as visually informing and attractive as possible, the marketplace and payment modules 218 and 220 may include one or more imaging modules 306 with which users may upload images for inclusion within listings. The imaging modules 306 may also operate to incorporate images within viewed listings. The imaging modules 306 may also support one or more promotional features, such as image galleries that are presented to potential buyers. For example, sellers may pay an additional fee to have an image included within a gallery of images for promoted items.

Listing creation modules 308 may allow sellers to conveniently author listings of items (e.g., parts, applications, etc.) pertaining to goods or services that they wish to transact via the network-based marketplace 76. For example, the listing creation modules 308 may enable sellers to identify their items as products. The listing management modules 310 may allow sellers to manage such listings. Specifically, where a particular seller has authored and/or published a large number of listings, the management of such listings may present a challenge. The listing management modules 310 may provide a number of features (e.g., auto-relisting, inventory level monitors, etc.) to assist the seller in managing such listings.

One or more post-listing management modules 312 may also assist sellers with a number of activities that may typically occur post-listing. For example, upon completion of an auction facilitated by one or more auction module(s) 282, a seller may wish to leave feedback regarding a particular buyer. To this end, the post-listing management modules 312 may provide an interface to one or more reputation module(s) 288, so as to allow the seller conveniently to provide feedback regarding multiple buyers to the reputation module(s) 288.

Dispute resolution module(s) 314 may provide mechanisms whereby disputes arising between transacting parties may be resolved. For example, the dispute resolution module(s) 314 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention modules 316 may implement fraud detection and prevention mechanisms to reduce the occurrence of fraud within the network-based marketplace 76.

Messaging modules 318 may be responsible for the generation and delivery of messages to users of the network-based marketplace 76, with such messages, for example, advising users regarding the status of listings at the network-based marketplace 76 (e.g., providing "outbid" notices to bidders during an auction process or providing promotional and merchandising information to users). Respective messaging modules 318 may utilize any one of a number of message delivery networks and platforms to deliver messages to users. For example, messaging modules 318 may deliver electronic mail (e-mail), instant message (IM), Short Message Service (SMS), text, facsimile, or voice (e.g., Voice over IP (VoIP)) messages via the wired network (e.g., the Internet), Plain Old Telephone Service (POTS), or wireless (e.g., mobile, cellular, WiFi (e.g., IEEE 802.11 technologies including 802.11n, 802.11b, 802.11g, and 802.11a)), Worldwide Interoperability for Microwave Access (e.g., WiMAX—IEEE 802.16) networks.

Retrieval modules 320 may support various searching functions that are made available to buyers to enable buyers to find listings. The network-based marketplace 76 itself, or one or more parties that transact via the network-based marketplace 76, may operate loyalty programs that are supported by one or more loyalty promotions module(s) 324. For example, a buyer may earn loyalty or promotions points for transactions established and/or concluded with a particular seller, and then be offered a reward for which accumulated loyalty points can be redeemed.

The network-based marketplace 76 may further include merchandising modules 326 that may enable merchandising items based on a user profile and cluster item information.

Figure 5:
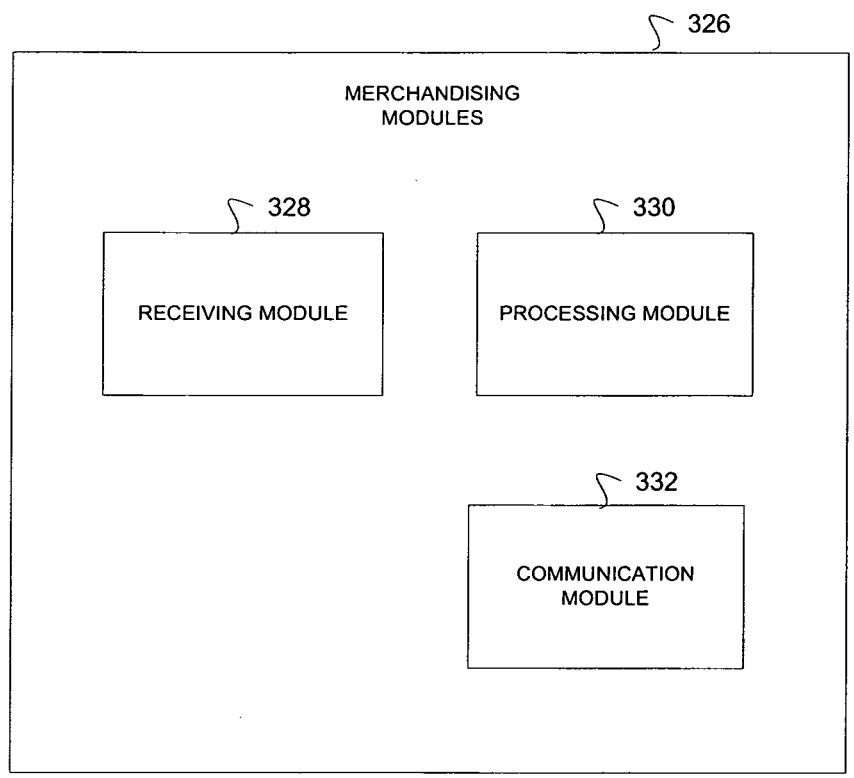
FIG. 5 is a block diagram illustrating merchandising modules, according to an embodiment.

FIG. 5 is a block diagram illustrating merchandising modules 326, according to an embodiment. The merchandising modules 326 may include a receiving module 328, a processing module 330, and a communication module 332. The receiving module 328 may be generally utilized to receive messages, requests, queries, item information and other types of information. The processing module 330 may be generally utilized to process received, stored, or other types of information to select one or more items for merchandising. The communication module 332 may be generally utilized to communicate merchandising information. For example, the communication module 332 may communicate the merchandising information in a user interface or as a message.

Data Structures

Figure 6A:
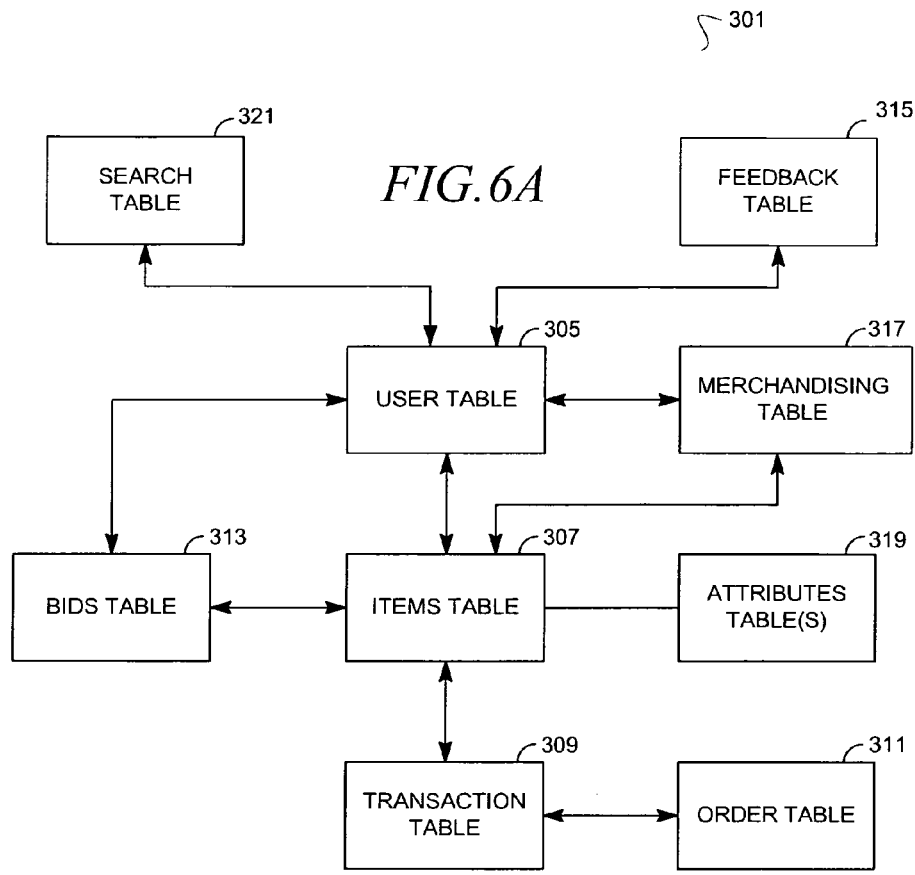
FIG. 6A is a block diagram illustrating database tables, according to an embodiment.

FIG. 6A is a high-level entity-relationship diagram illustrating various tables 301 that may be maintained within the databases 224, and that are utilized by and support the marketplace modules 218 and payment modules 220. A user table 305 contains a record for registered users of the network-based marketplace 76. A user may operate as a seller, a buyer, or both, within the network-based marketplace 76. In one example embodiment, a buyer may be a user that has accumulated value (e.g., commercial or proprietary currency), and is accordingly able to exchange the accumulated value for items that are offered for sale by the network-based marketplace 76.

The tables 301 also include an items table 307 in which item records are maintained for goods (e.g., parts) and services that are available to be, or have been, transacted via the network-based marketplace 76. Item records within the items table 307 may furthermore be linked to one or more user records within the user table 305, so as to associate a seller and one or more actual or potential buyers with an item record.

A transaction table 309 contains a record for each transaction (e.g., a purchase or sale transaction) pertaining to items for which records exist within the items table 307.

An order table 311 may be populated with order records, with each order record being associated with an order. Each order, in turn, may be associated with one or more transactions for which records exist within the transaction table 309.

Bid records within a bids table 313 may relate to a bid received at the network-based marketplace 76 in connection with an auction-format listing supported by one or more auction modules 282, as shown in FIG. 4. A feedback table 315 may be utilized by one or more reputation modules 288, in one example embodiment, to construct and maintain reputation information concerning users. A merchandising table 317 may be used to store information that is utilized to merchandise products. One or more attributes tables 319 record attribute information pertaining to items for which records exist within the items table 307. Considering only a single example of such an attribute, the attributes tables 319 may indicate a currency attribute associated with a particular item, with the currency attribute identifying the currency of a price for the relevant item as specified by a seller. A search table 321 may store search information that has been entered by a user (e.g., buyer) who is looking for a specific type of listing.

Figure 6B:
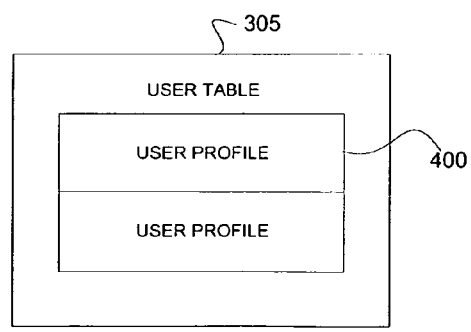
FIG. 6B is a block diagram illustrating a user table, according to an embodiment.

FIG. 6B is a block diagram illustrating a user table 305, according to an embodiment. The user table 305 may include a user profile 400 for each user that utilizes the network based marketplace 76. A user may interact with the network-based marketplace 76 in different capacities. For example, a user may interact as a buyer, seller, administrator or some other role.

FIG. 7A is a block diagram illustrating a user profile 400, according to an embodiment. The user profile 400 may include user information 412 and user application information 414. The user information 412 may include the user name, the user address, user telephone numbers and user email addresses, user credit information, user bank account information and other user information.

The user application information 414 may include multiple application listings 415 (e.g., rows) that correspond to different applications (e.g., products) associated with the user. In some embodiments the user application information 414 may be further organized according to domains. For example, the user application information 414 may include sections of application listings 415 dedicated to a particular domain (e.g., trucks, cars, printers, toys, books, etc.). Each application listing 415 may include a product identifier 416, a product history 417, and a probability 418. For example, the product identifier 416 may identify a Ford Tacoma Truck as associated with the user because the network-based marketplace 76 identified the user as purchasing parts for a Ford Tacoma Truck. Accordingly, the product identifier 416 may indicate that the user is associated with the product by detecting an activity that is related to the product. The product history 417 may describe the product and events related to the product, as described further below. The probability 418 may indicate likelihood that the corresponding product is associated with the user. For example, the probability may be high (e.g., 100%) signifying a strong association with the user, or low, signifying a weak association with the user. For example, a probability of 100% may be assigned to a product (e.g., application) for which compatible parts are purchased by the user. Also for example, probabilities of 50% may be assigned to two products for which a user purchases a single part that is identified as compatible with both products (e.g., applications). The probability 418 may be utilized to provide a basis for ranking the merchandising of items that may be compatible with the user application information 414.

FIG. 7B is a block diagram illustrating product history 417, according to an embodiment. The product history 417 may store product history information 420 and part history information 422. For example, the product history information 420 may include the year the product was made, a condition of the product (e.g., used, new, refurbished), dates the user purchased parts that are compatible with the product, the seller of the product, etc. The part history information 422 may describe parts that are compatible with the corresponding application.

FIG. 7C is a block diagram illustrating part history information 422, according to an embodiment. The part history information 422 may be utilized to describe one or more items (e.g., parts) and activities performed by the user in association with the item. The part history information 422 may include one or more part listings 423 that respectively include a product identifier 416 that is associated with part activity information 424. The product identifier 416 identifies an item (e.g., part), and the part activity information 424 stores activity related to the item (e.g, part) that was performed by the user. For example, the part activity information 424 may store a count of user purchases of the part, a count of user requests to watch the part, or a count of user requests to view the part. The part history information 422 may be utilized to generate the probability 418.

FIG. 7D is a diagram illustrating a merchandising table 317, according to an embodiment. The merchandising table 317 may include application inference information 430, item cluster information 432, replacement information 434, content data information 436, and buying trend information 438 as described further below.

Figure 8A:
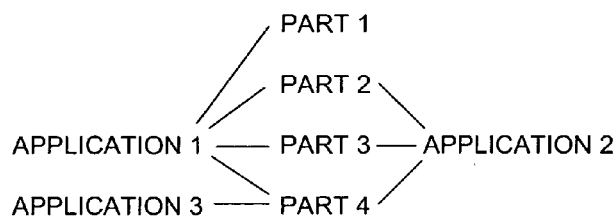
FIG. 8A is a block diagram illustrating application inference information, according to an embodiment.

FIG. 8A is a block diagram conceptually illustrating application inference information 430. The application inference information 430 may include parts, applications and lines that connect the parts with the applications. The lines signify a part as being compatible with or fitting an application. For example, the application inference information 430 is illustrated with lines that signify parts 1, 2, 3 and 4 as compatible with application 1; parts 2, 3, and 4 as compatible with application 2; and part 4 as compatible with application 3.

Figure 8B:
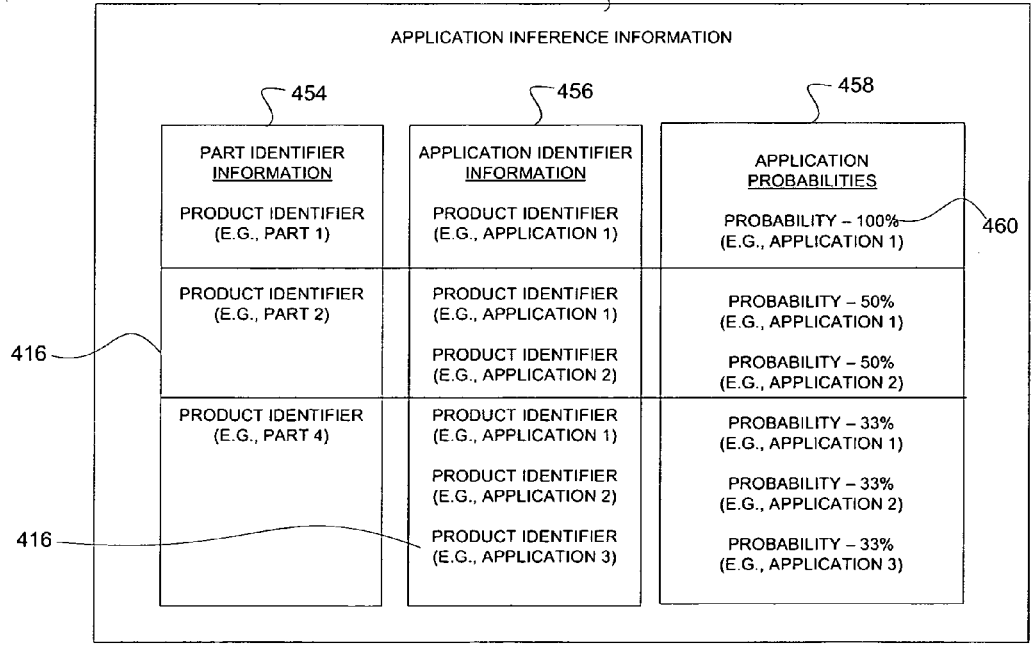
FIG. 8B is a block diagram illustrating application inference information, according to an embodiment.

FIG. 8B is a block diagram further illustrating application inference information 430, according to an embodiment. The application inference information 430 of FIG. 8B is a tabular and more detailed presentation of the concepts presented in FIG. 8A. The application inference information 430 may include rows that correspond to parts that are compatible with applications. Each row may include part identifier information 454, application identifier information 456 including one or more product identifiers 416 that respectively correspond to an application probability 460. That is, each product identifier is associated with an application that corresponds to an application probability 460. The part identifier information 454 may include a product identifier 416 that identifies a part. The application identifier information 456 may include a product identifier 416 that that identifies an application that includes the corresponding part. The application probabilities 458 signify the likelihood that an application is associated with a user. The applications probabilities 458 may be based on the predictive value of a part that corresponds to the application. For example, an identification of a user performing an activity related to part 1 signifies that application 1 has a 100% likelihood of being associated with the user because part 1 is only compatible with application 1. Also for example, an identification of a user performing an activity related to part 4 signifies applications 1, 2 and 3 have respective likelihoods of 33% of being associated with the user because part 4 is respectively compatible with applications 1, 2 and 3. Accordingly, an identification of an activity related to a particular part may be utilized to identify a likelihood that the user may be associated with or interested in one or more application according to the designated probabilities.

Figure 9A:
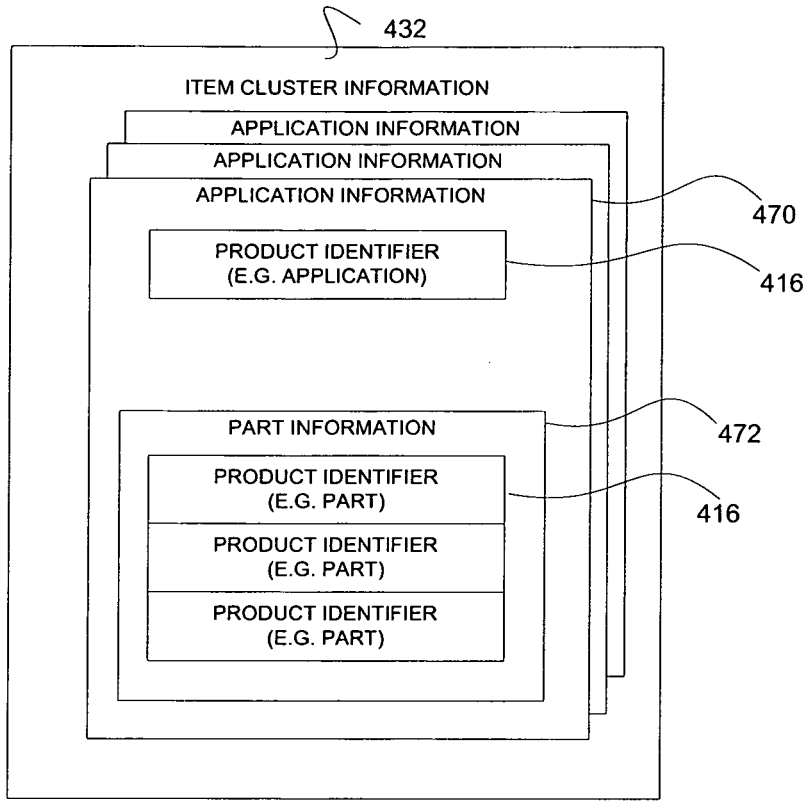
FIG. 9A is a block diagram illustrating item cluster information, according to an embodiment.

FIG. 9A is a block diagram illustrating item cluster information 432, according to an embodiment. The item cluster information 432 may include application information 470 for one or more applications and part information 472 for the respective applications. The item cluster information 432 may be utilized to associate a part with one or more applications the part is compatible with or to associate an application with one or more parts that are compatible with the application. The application information 470 may include product identifier 416 to identify an application and corresponding part information 472 that may include product identifiers 416 to identify parts that are compatible with the application. In another embodiment a single record may store multiple applications in association with a single part. In yet another embodiment a table may store multiple applications in association with multiple parts.

Figure 9B:
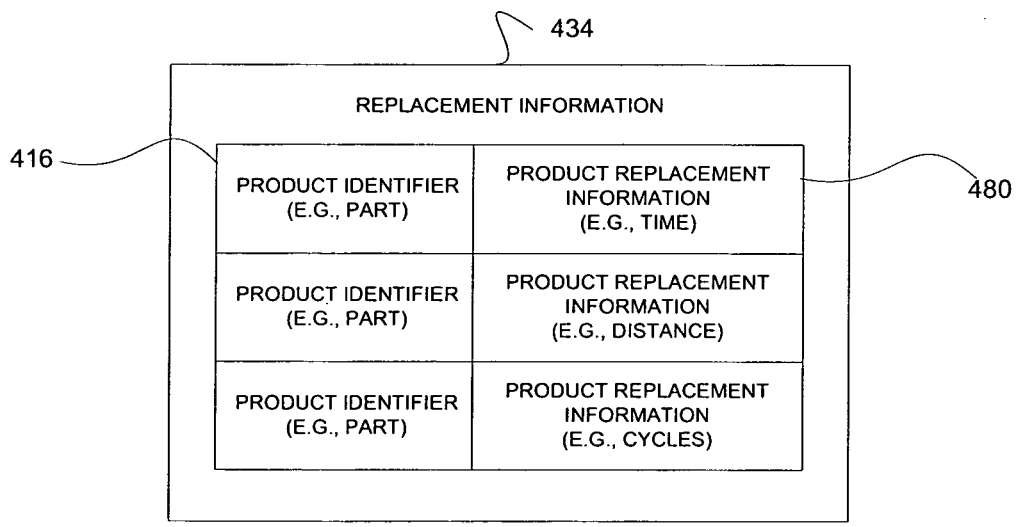
FIG. 9B is a block diagram illustrating replacement information, according to an embodiment.

FIG. 9B is a block diagram illustrating replacement information 434, according to an embodiment. The replacement information 434 may be utilized to select a candidate item for merchandising. The replacement information 434 may store information for multiple products. Each row corresponds to a product that is identified with a product identifier 416 and associated with product replacement information 480. The product replacement information 480 may include a metric that may be used to replace a part for an application. For example, the metric may include time, distance, cycles, etc. For example, a tire may be a part of an automobile that is replaced after forty-thousand miles. Also for example, an office chair may be a part of a set of office furniture that is recommended to be replaced after two years.

FIG. 10A is a block diagram illustrating content data information 436, according to an embodiment. The content data information 436 may be utilized to generate item cluster information 432 (FIG. 9A) that may be used to associate a part with one or more applications that are compatible with the part or to associate an application with one or more parts that are compatible with the application. For example, the network-based marketplace 76 may analyze the content data information 436 to identify parts that are compatible with an application and applications that are compatible with a part. The content data information 436 may include commercial content data information 490 and non-commercial content data information 492.

The commercial content data information 490 may be purchased from a commercial content provider that operates a third-party server 228 and utilizes a third-party module 226 to communicate the commercial content data information 490 to the network-based marketplace 76. The commercial content data information 490 may include instructional information 494 and catalogue information 496. The instructional information 494 may for example include a How-to-Manual that provides instructions for assembling multiple parts to create an application. For example, the How-to-Manual may be embodied as a video, DVD, booklet, You-Tube video, etc. The catalogue information 496 may include commercial catalogues that are directed to a particular product domain including automobiles, computers, printers, toys, BBQs, homes, or any other catalogue that relates an application (e.g., product) and compatible parts.

The non-commercial content data information 492 may not be purchased but freely obtained locally at the network-based marketplace 76 or remotely from a third-party server 228. The non-commercial content data information 492 may also include instructional information 498, as previously described, catalogue information 496, as previously described, and user commentary 500. The user commentary may for example, include blogs, feedback, product reviews, etc.

FIG. 10B is a block diagram illustrating buying trend information 438, according to an embodiment. The buying trend information 438 may be utilized to select a candidate item (e.g., part) for merchandising. The buying trend information 438 may include multiple entries of buying trend product information 510 for different products.

FIG. 10C is a block diagram illustrating buying trend product information 510, according to an embodiment. The buying trend product information 510 may include a product identifier 416 that identifies a product (e.g., part), a query count 520, a view count 522, a watch count 524, a purchase count 525, a sample period 526, and a product rank 528. The query count 520 may store a count of the number of times the product was identified as requested in a query for the sample period 526 (e.g., months, days, hours, etc.). For example, the network based marketplace 76 may receive a query and parse the query to identify one or more keywords that identify the product. The view count 522 may store a count of the number of times the product was viewed on a user interface for the sample period 526. The watch count 524 may store a count of the number of times the product was identified for monitoring by a user on the network-based marketplace 76. For example, a user may request to monitor an auction that features a product in the form of an item for auction. The purchase count 525 may store a count of the number of times the product in the form of an item was purchased or won in an auction on the network-based marketplace 76. Finally, the product rank 528 may be a ranking of a particular product with the other products also identified in the buying trend information 438 based on an analysis of query counts 520, view counts 522, watch counts 524, and purchase counts 525. Accordingly, a rank of one may identify the product with the strongest buying trend relative to the other products and a rank of N may identify the product with the weakest buying trend relative to the other products.

Figure 11:
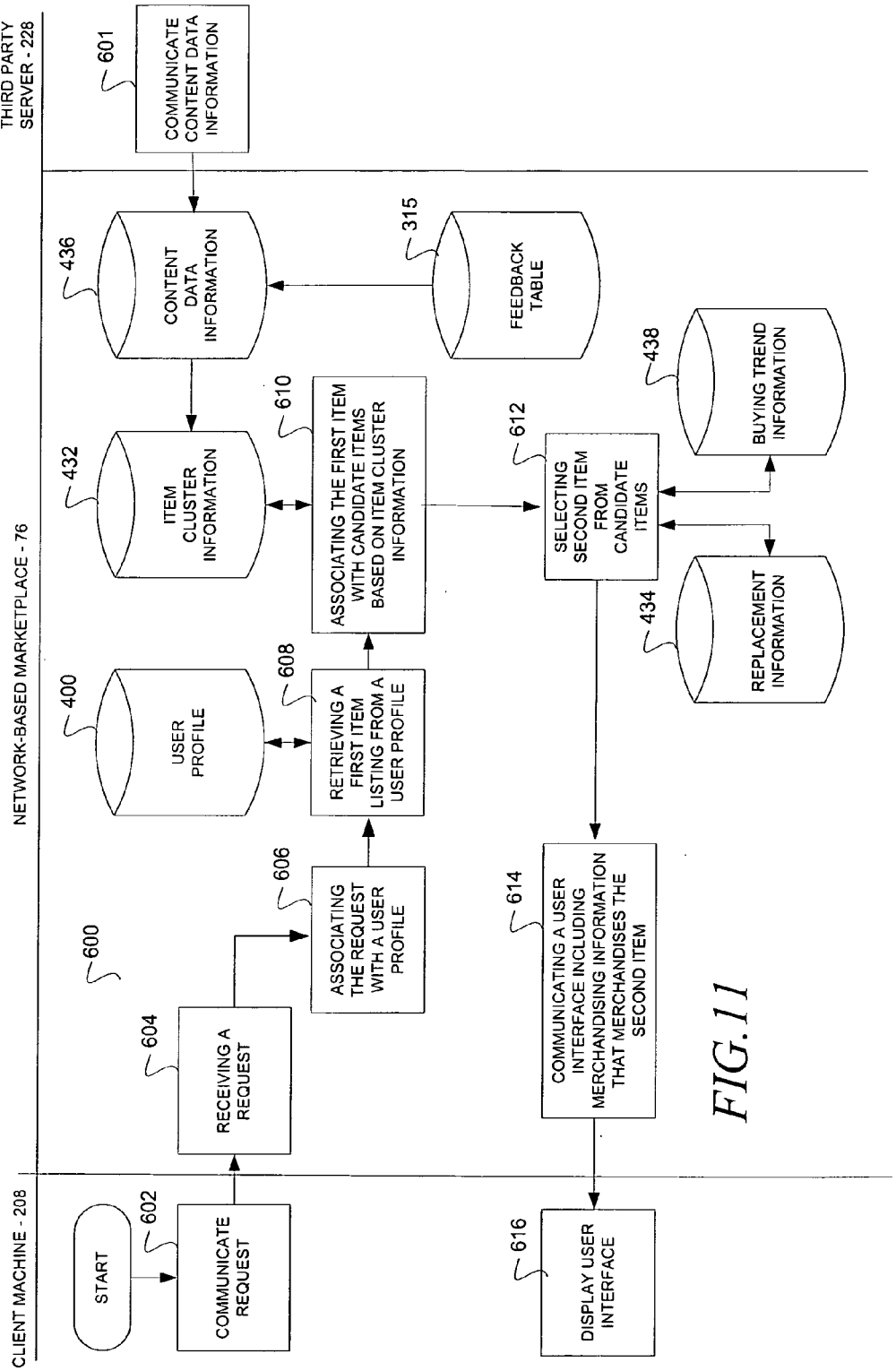
FIG. 11 is a flow chart illustrating a method to merchandise a product based on a compatibility, according to an embodiment.

FIG. 11 is a flow chart illustrating a method 600, according to an embodiment, to merchandise a product based on compatibility. Illustrated on the left is a client machine 208; illustrated on the right is a third party server 228 (e.g., commercial content provider); and illustrated in the middle is a network-based marketplace 76. The method 600 may commence at operation 601 or operation 602. For example, the method 600 may commence at operation 601 to generate item cluster information 432 that is utilized by the remaining operations of the method 600.

At operation 601 the third-party server 228 may communicate content data information 436 to the network-based marketplace 76. For example, the third-party server 228 may communicate instructional information 494 in the form of a video. The network-based marketplace 76 may receive and store the content data information 436 in a database 224. Next, the network-based marketplace 76 may analyze the content data information 436 to generate item cluster information 432 that is stored in the database 224. For example, the network-based marketplace 76 may generate application information 470 (e.g., automobile applications) and part information 472 (automobile parts) (shown in FIG. 9A).

At operation 602, the client machine 208 may communicate a request to the network-based marketplace 76. At operation 604, at the network-based marketplace 76, the receiving module 328 may receive the request, and at operation 606 the processing module 330 (shown in FIG. 5) may associate the request with a user profile 400. For example, the processing module 330 may identify the request as originating with a user that has logged onto the network based marketplace 76 and is communicating from a particular client machine 208 that may be identified based on the contents of the request. At operation 608, the processing module 330 may retrieve a first item listing in that describes an item the form of an application from the user profile 400. For example, the processing module 330 may retrieve a product identifier 416 (FIG. 7A) that identifies the application. At operation 610 the processing module 330 may associate the application with candidate items based on item cluster information 432. For example, the processing module 330 may utilize a cluster service that receives a product identifier 416 for the application, accesses the item cluster information 432 based on the product identifier 416 and returns candidate items that are compatible with the application. For example, the cluster service may utilize the product identifier 416 of the application to access the item cluster information 432 and retrieve a plurality of candidate items in the form of part information 472 (FIG. 9A) (e.g., product identifiers 416). At operation 612, the processing module 330 may select a second item in the form of an item from the plurality of candidate items based on buying trend information 438 (FIG. 7D). For example, the processing module 330 may access the product rank 528 (FIG. 10C) in the buying trend product information 510 for each of the candidate items and select the candidate item with the lowest product rank 528. Accordingly, the processing module 330 may select the item with the strongest buying trend product information 510 from the candidate items. At operation 614, the communication module 332 may generate a user interface including merchandising information featuring the selected item (e.g., tires) and communicate the user interface to the client machine 208.

Figure 16:
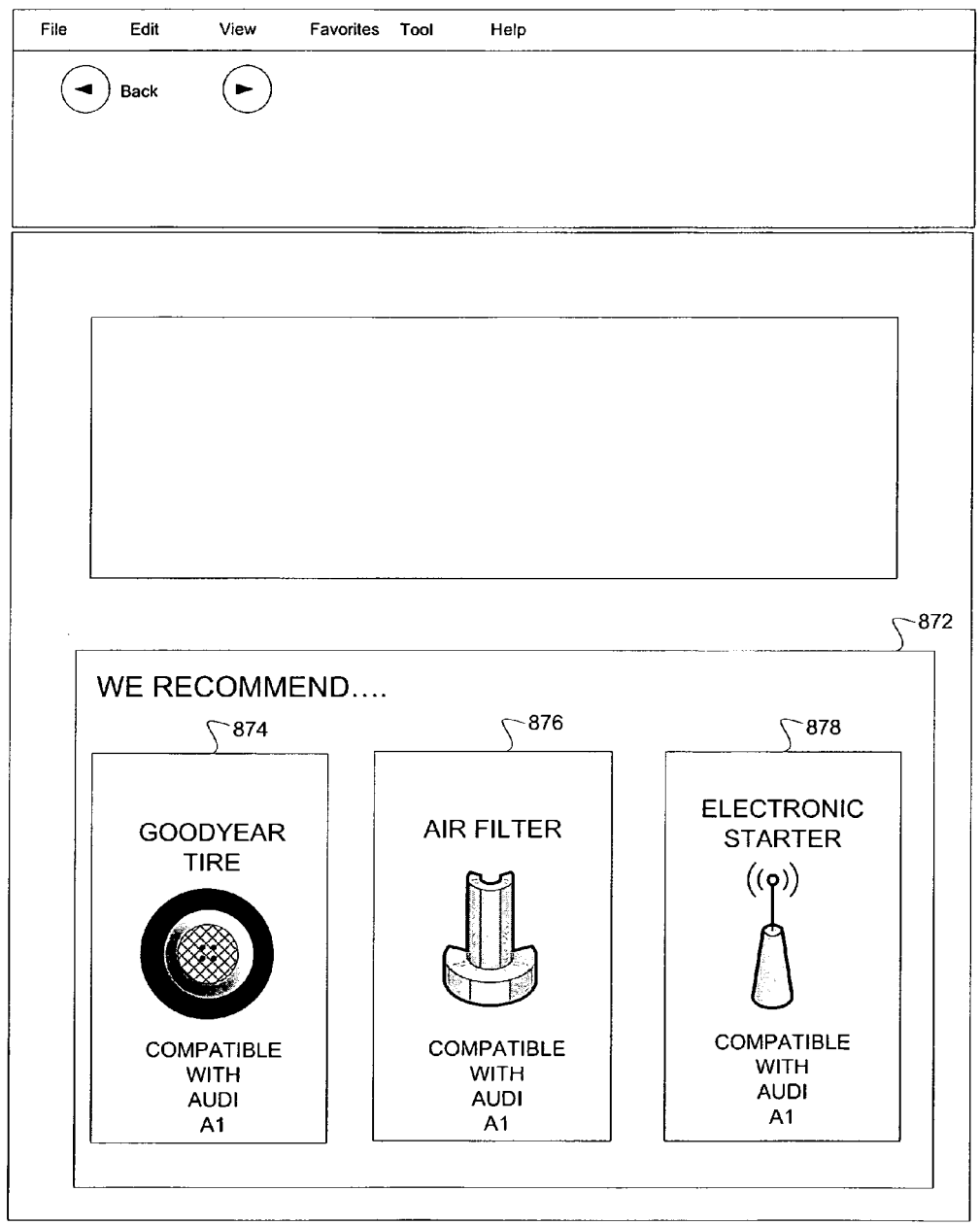

At operation 616, the client machine 208 receives the user interface and displays the user interface to the user. For example, FIG. 16 shows a user interface 870 that includes merchandising information featuring the selected items that are compatible with the same application.

Other Embodiments

In another embodiment, the processing module 330 may utilize replacement information 434 (FIG. 7D) rather than buying trend information 438 to select the item from the candidate items at operation 612. To this end, the processing module 330 may select an item from the candidate items at operation 612 based on product replacement information 480 (FIG. 9B). For example, the processing module 330 may identify the application as a Toyota Tacoma Truck, and one of the candidate items as a tire associated with product replacement information 480 that indicates the tires need to be replaced. In one embodiment the product replacement information 480 may include a period of time (e.g., 4 years) that may be compared with the product history 417 (FIG. 7A) that is associated with the truck (e.g., application) in the user profile 400. For example, the product history 417 may indicate the truck was manufactured five years ago and does not include any purchases of tires. In another embodiment the product replacement information 480 may include a quantity of miles (e.g., 40,000 miles) that may be compared with the product history 417 that is associated with the truck (e.g., application). For example, the product history 417 for the truck may indicate that the odometer on the truck reads 50,000 miles and does not include any purchases of tires.

In another embodiment the communication module 332 may generate a message rather than a user interface. For example, the communication module 332 may generate a message including merchandising information that features the selected item (e.g., tires) and communicate the message to an application programming interface at another machine (e.g., server).

In another embodiment the network-based marketplace 76 may receive the content data information 436 from an internal data source rather than an external data source. For example, the network-based marketplace 76 may receive the content data information 436 from the feedback table 315 (FIG. 6A) that is local to the network-based marketplace 76. Merely for example, the feedback table 315 may include user comments that describe tires for a Toyota Tacoma Truck. Also for example, the network-based marketplace 76 may receive the content data information 436 from the transaction table 309 that includes records of transactions enabling the identification of purchasing patterns.

In another embodiment, the processing module 330 may select multiple items from the candidate items and the communication module 322 may generate merchandising information featuring the multiple items for inclusion in a user interface or a message.

Figure 12:
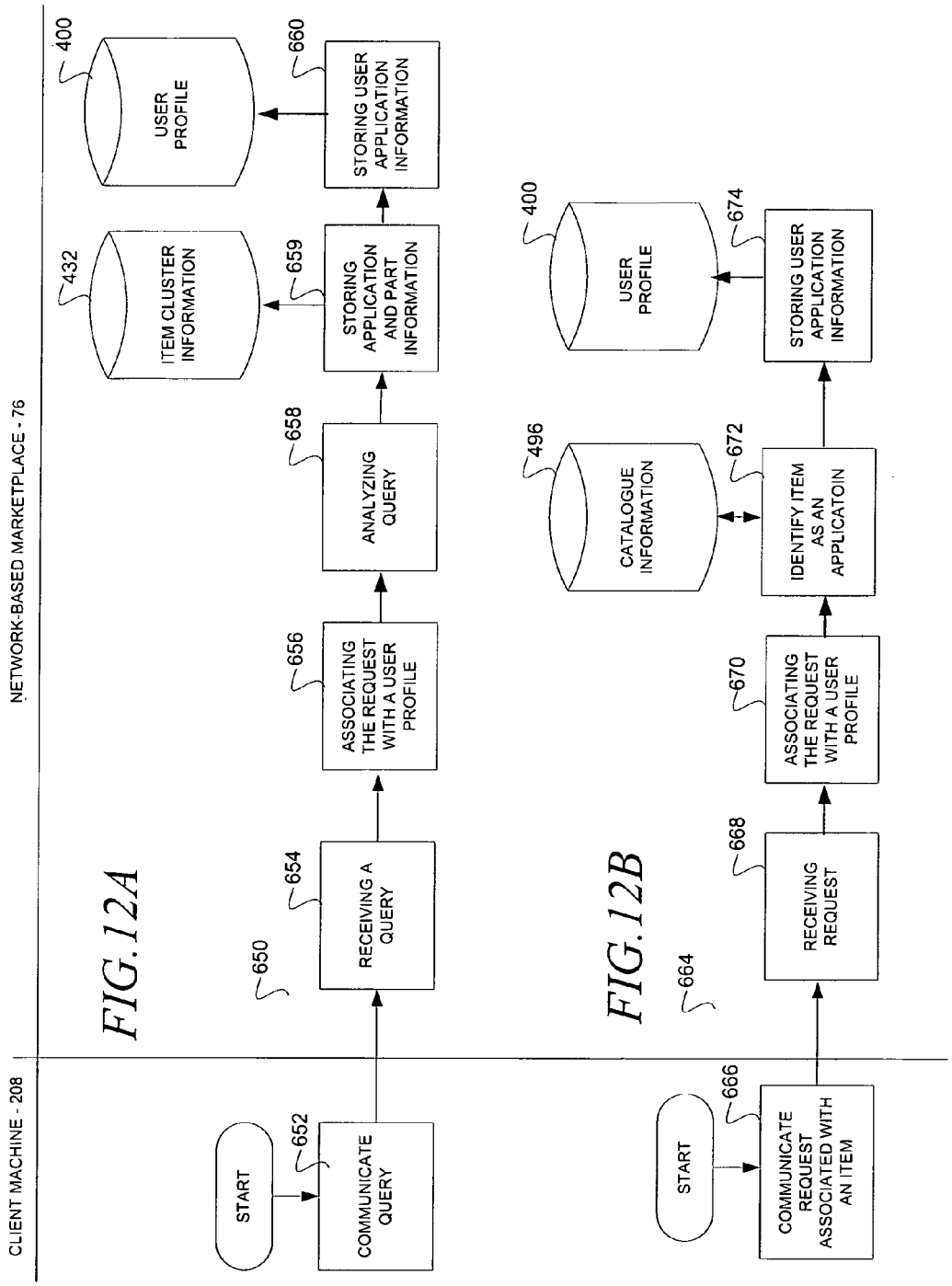
FIG. 12A is a flow chart illustrating a method to initialize item cluster information and a user profile, according to an embodiment.
FIG. 12B is a flow chart illustrating a method to initialize a user profile, according to an embodiment.

FIG. 12A is a flow chart illustrating a method 650 to initialize item cluster information and a user profile, according to an embodiment. Illustrated on the left is a client machine 208 and illustrated on the right is a network-based marketplace 76. The method 650 may commence at operation 652 with the client machine 208 communicating a query to the network-based marketplace 76.

At operation 654, the receiving module 328, at the network-based marketplace 76, may receive the query, and at operation 656 the processing module 330 may associate the request with a user profile 400 for a user, as previously described. At operation 658, the processing module 330 may analyze the query to identify an application and part that is compatible with the application. For example, the query may include "Goodyear 225/50R17 Tires Toyota Tacoma Truck" and the processing module 330 may identify "Toyota Tacoma" as a truck application and "Goodyear 225/50R17 Tires" as a part that is compatible with the "Toyota Tacoma Truck." Next, the processing module 330 may identify product identifiers for the "Toyota Tacoma Truck" and the "Goodyear 225/50R17 Tires." At operation 659, the processing module 330 may store application information 470 in association with part information 472 in the item cluster information 432. For example, the processing module 330 may store the application information 470 in the form of a product identifier 416 (e.g., "Toyota Tacoma Truck") in association with the part information 472 (e.g., "Goodyear 225/50R17 Tires") in the form of a product identifier 416 in the item cluster information 432. At operation 660, the processing module 330 may store user application information 414 in the user profile 400 for the user. For example, the processing module 330 may store user application information by storing an application listing 415 in the form of a product identifier 416 (e.g., "Toyota Tacoma Truck") in the user profile 400 for the user, and the process ends.

FIG. 12B is a flow chart illustrating a method 664 to initialize a user profile 400, according to an embodiment. Illustrated on the left is a client machine 208 and illustrated on the right is a network-based marketplace 76. The method 664 may commence at operation 666 with the client machine 208 communicating a request that is associated with an item to the network-based marketplace 76. For example, the request may include a request to purchase an item, a request to watch an item, or a request view an item. The request to purchase an item may include a request to purchase the item at a predetermined price or a request to submit a bid that wins an auction. The request to watch an item may include a request to receive an email responsive to a change in status of the listing of an item. For example, the item may be relisted or won in an auction or receive a bid that exceeds a predetermined price. The request to view an item may include a selection of the item from search results or by browsing multiple categories to identify and select the item.

At operation 668, the receiving module 328, at the network-based marketplace 76, may receive the request, and at operation 670 the processing module 330 may associate the request with a user profile 400 for a user, as previously described. At operation 672, the processing module 330 may identify the item as an application. For example, the processing module 330 may utilize catalogue information 496 to identify the item as an application. At operation 674, the processing module 330 may store the item in the user profile 400 as user application information 414 (FIG. 7A). For example, the processing module 330 may store an application listing 415 including the product identifier 416 for the item in the user profile 400.

Figure 13:
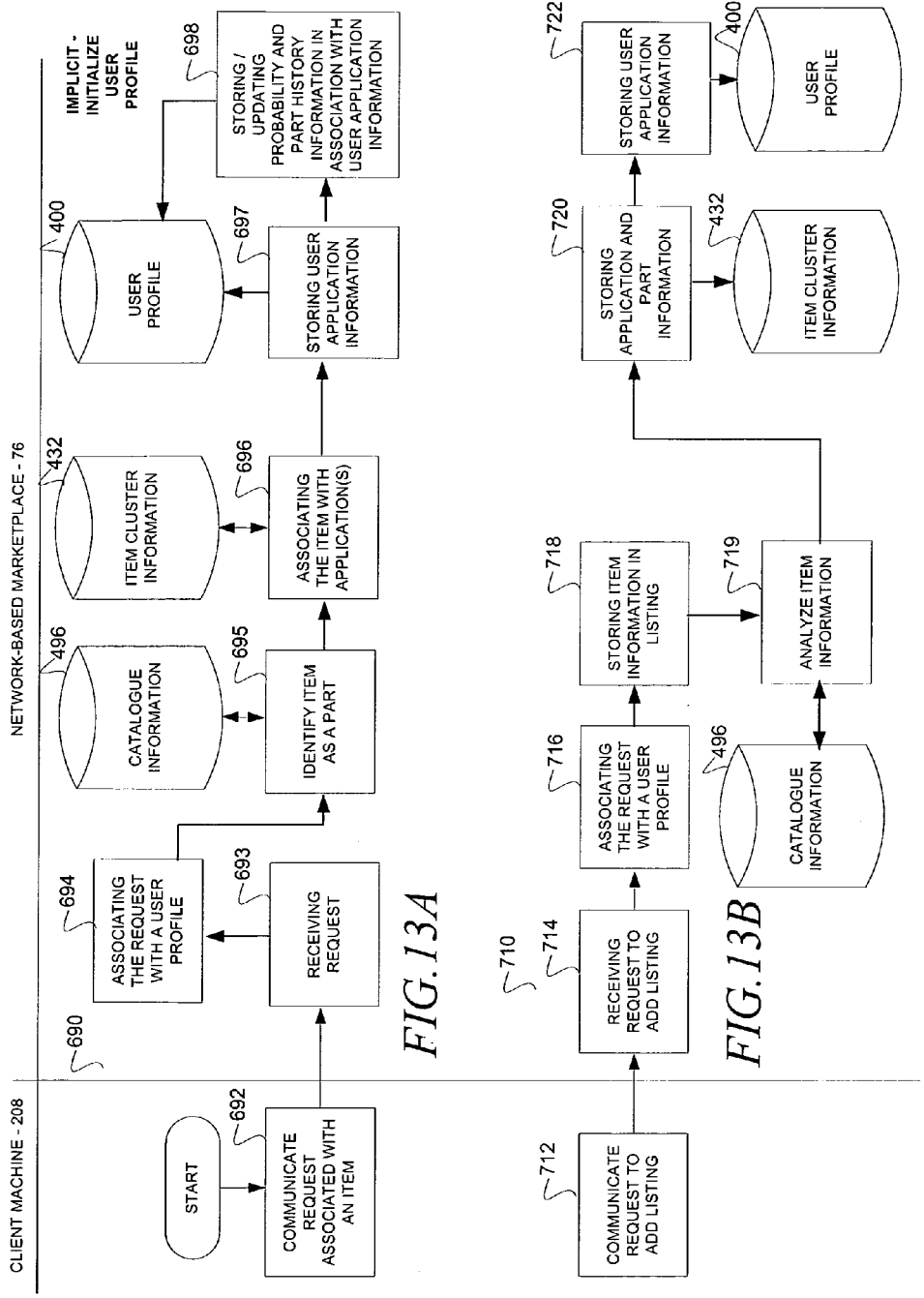
FIG. 13A is a flow chart illustrating a method to initialize item cluster information and a user profile, according to an embodiment.
FIG. 13B is a flow chart illustrating a method to initialize item cluster information and a user profile, according to an embodiment.

FIG. 13A is a flow chart illustrating a method 690 to initialize a user profile 400, according to an embodiment. Illustrated on the left is a client machine 208 and illustrated on the right is a network-based marketplace 76. The method 690 may commence at operation 692 with the client machine 208 communicating a request that is associated with an item to the network-based marketplace 76. For example, the request may include a request to purchase an item, a request to watch an item, or a request to view an item. The request to purchase an item may include a request to purchase the item at a predetermined price or to submit a bid that wins an auction. The request to watch an item may include a request to receive an email responsive to a change in status of the listing of an item. For example, the item may be relisted or won in an auction or receive a bid that exceeds a predetermined price. The request to view an item may include a selection of the item from search results or by browsing multiple categories to identify and select the item.

At operation 693, the receiving module 328, at the network-based marketplace 76, may receive the request, and at operation 694 the processing module 330 may associate the request with a user profile 400 for a user, as previously described. At operation 695, the processing module 330 may identify the item as a part that fits one or more applications. For example, the processing module 330 may utilize catalogue information 496 to identify the item as a part. At operation 696, the processing module 330 associates the item (e.g., part) with one or more applications that are compatible with the item. For example, the processing module 330 may utilize the item cluster information 432 to associate the part with one or more applications. At operation 697, the processing module 330 may store the one or more applications in the user profile. For example, the processing module 330 may store an application listing 415 including the product identifier 416 for an application in the user profile 400. At operation 698, the processing module 330 may store probability 418 (FIG. 7A) and part history information 422 (FIG. 7B) in association with the one or more applications. For example, consider the case where a part (e.g., tire) is purchased that has an equal chance of fitting an Audi A1 or a Volkswagen Golf. The processing module 330 may store the probability 418 of 50% and the product identifier 416 for the Audi A1 and the probability 418 of 50% and the product identifier 416 for the Volkswagen Golf. Further, the processing module 330 may store a part listing 423 including the product identifier 416 for the item (e.g., part, tire) in the part history information 422 and register the purchase in the part activity information 424 (FIG. 7C). For example, the processing module 330 may increment a count for purchases in the part activity information 424.

In another example, the above method 690 may be utilized to update one or more probabilities 418 in the user profile 400. Consider, for example, a user profile with a car domain that stores the following:

| Application | Probability |
| --- | --- |
| Audi A1 | 50% |
| Volkswagen Golf | 50% |

For example, the user profile 400 may include a car domain that includes an application listing 415 that includes a product identifier 416 for an Audi and an application listing 415 that includes a product identifier for a Volkswagen Golf Further, each of the product identifiers 416 may be associated with probabilities 418 of 50%. Now consider receipt of a message that may describe a purchase of a part that is identified with a product identifier 416. In response to receiving the message, the processing module 330 may access the application inference information 430 (FIG. 8B) based on the product identifier 416 to identify only the Audi A1 application in association with a probability of 100%. That is, the information of the purchase of the part may be utilized by the processing module 330 to confirm the Audi A1 as associated with the user and not the Volkswagen Golf. Accordingly, the processing module 330 may update the probability associated with the Audi A1 to 100% and the probability associated with the Volkswagen Golf to 0%.

FIG. 13B is a flow chart illustrating a method 710 to initialize item cluster information 432 and a user profile 400, according to an embodiment. Illustrated on the left is a client machine 208 and illustrated on the right is a network-based marketplace 76. The method 710 may commence at operation 712 with the client machine 208 communicating a request to add a listing to the network-based marketplace 76. For example, a seller may wish to add the listing to auction an item or offer an item for sale on the network-based marketplace 76. The request may include item information that describes the item and one or more applications that include the item. For example, the item information may include the string "Goodyear 225/50R17 Tire" as the item for sale and the strings "Toyota Tacoma Truck" and "Audi A1" as applications that are compatible with or may be fitted with the "Goodyear 225/50R17 Tire." At operation 714, at the network-based marketplace 76, the receiving module 328 may receive the request to add the listing. At operation 716, the processing module 330 may associate the request with a user profile 400. For example, the user profile 400 may be for the seller that is listing the item. At operation 718, the network-based marketplace 76 may store the item information in the listing. At operation 719, the processing module 330 may analyze the listing information to identify the string "Goodyear 225/50R17 Tire" as a part and the strings "Toyota Tacoma Truck" and "Audi A1" as applications that are compatible with the part. Further, the processing module 330 may associate product identifiers 416 with the part and applications. In one embodiment, the processing module 330 may utilize catalogue information 496 to analyze the item information to identify the part and applications and to associate product identifiers 416 to the part and the respective applications. At operation 720, the processing module 330 may store the "Goodyear 225/50R17 Tire" in conjunction with the compatible applications "Toyota Tacoma Truck" and "Audi A1." For example, the processing module 330 may store a product identifier 416 for the "Goodyear 225/50R17 Tire" as part information 472 in the item cluster information 432 in conjunction with product identifiers 416 for the Tacoma Truck" and "Audi A1" respectively being stored as application information 470 in the item cluster information 432. At operation 722, the processing module 330 may store the one or more applications in the user profile 400. For example, the processing module 330 may store an application listing 415 including a product identifiers 416 for the Tacoma Truck" and "Audi A1" as user application information 414 in the user profile 400.

Figure 14:
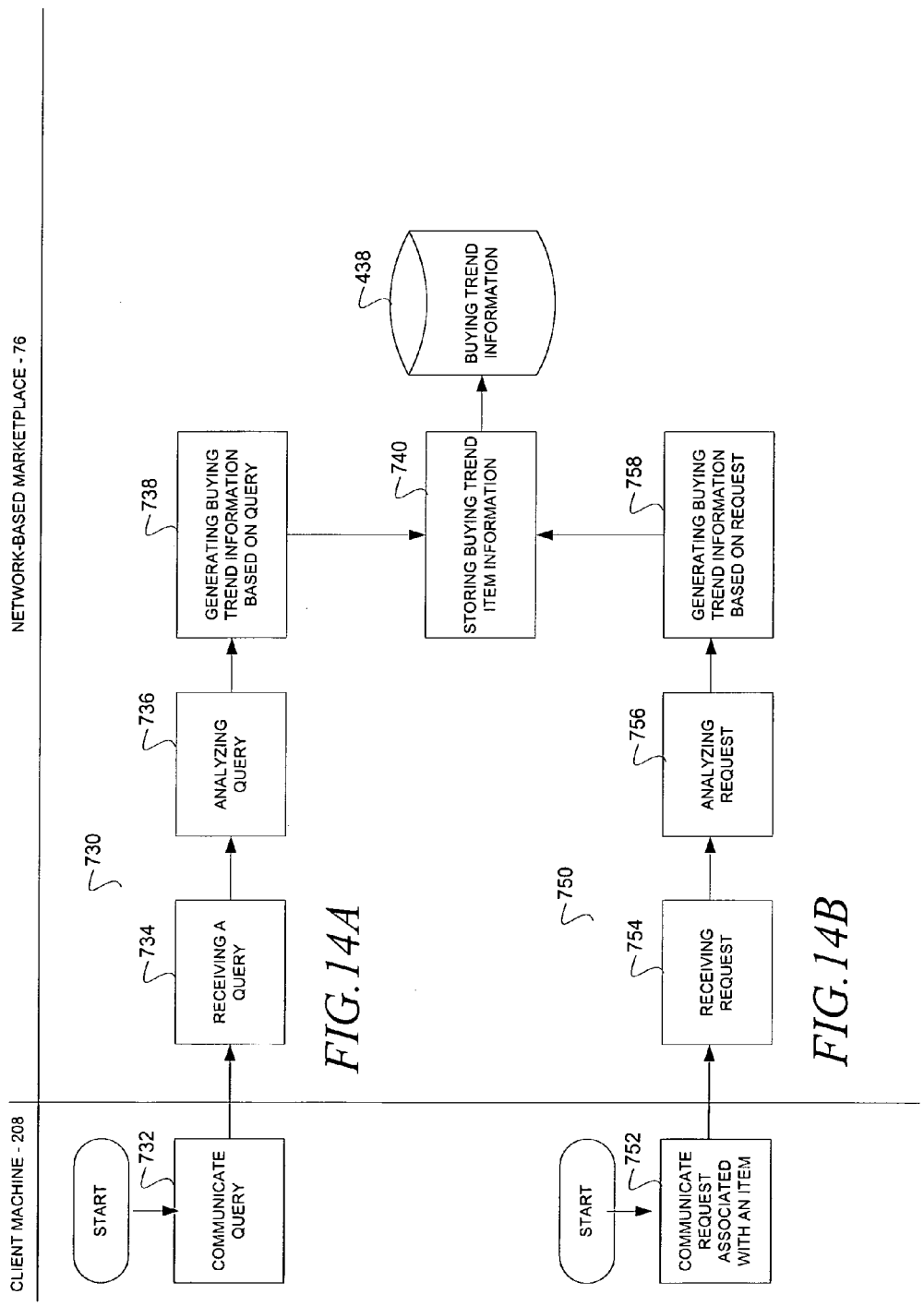
FIG. 14A is a flow chart illustrating a method to initialize buying trend information based on a query, according to an embodiment.
FIG. 14B is a flow chart illustrating a method to initialize buying trend information based on a request associated with an item, according to an embodiment.

FIG. 14A is a flow chart illustrating a method 730 to initialize buying trend information 438 (FIG. 7D) based on a query, according to an embodiment. Illustrated on the left is a client machine 208 and illustrated on the right is a network-based marketplace 76. The method 730 may commence at operation 732 with the client machine 208 communicating a query.

At operation 734, at the network-based marketplace 76, the receiving module 328 receives the query, and at operation 736, the processing module 330 analyzes the query to identify an item (e.g., part) and a product number 416 that corresponds to the part. For example, the processing module 330 may identify "Goodyear Tire" as a part in the query "Goodyear Tires fit Toyota Tacoma." At operation 738, the processing module 330 may generate buying trend product information 510 (FIG. 10C) based on the query. For example, the processing module 330 may increment the query count 520 for the buying trend information 438 that corresponds to the product identifier 416 for "Goodyear Tires." In addition, the processing module 330 may update the product rank 528 for each of the respective buying trend product information 510 entries in the buying trend information 438 responsive to receiving the query and, at operation 438, store the buying trend product information 510 entries as buying trend information 438 in the database.

FIG. 14B is a flow chart illustrating a method 750 to initialize buying trend information 438 based on a request associated with an item, according to an embodiment. Illustrated on the left is a client machine 208 and illustrated on the right is a network-based marketplace 76. The method 750 may commence at operation 752 with the client machine 208 communicating a request to the network-based marketplace 76. For example, the request may include a request to purchase an item, a request to watch an item, or a request view an item. The request to purchase an item may include a request to purchase the item at a predetermined price or to submit the winning bid in an auction. The request to watch an item may include a request to receive an email responsive to a change in status of the listing of an item. For example, the item may be relisted or won in an auction or receive a bid that exceeds a predetermined price. The request to view an item may include a selection of the item from search results or by browsing multiple categories to identify and select the item.

At operation 754, the receiving module 328, at the network-based marketplace 76, may receive the request, and at operation 756, the processing module 330 may analyze the request to associate the item with a product identifier 416 and determine the type of request. At operation 758, the processing module 330 may generate buying trend product information 510 based on the request, and at operation 740, store the buying trend product information 510. For example, the processing module 330 may increment a count associated with the product identifier 416 for the item including a view count 522 (FIG. 10C) responsive to receiving a request to view the item, a watch count 524 responsive to receiving a request to watch the item, or a purchase count 525 responsive to receiving a request to buy or enter a bid that wins an auction. Finally, the processing module 330 may update the product rank 528 for each of the respective buying trend product information 510 entries responsive to receiving the request and store the buying trend product information 510 entries as buying trend information 438 in the database.

Figure 15:
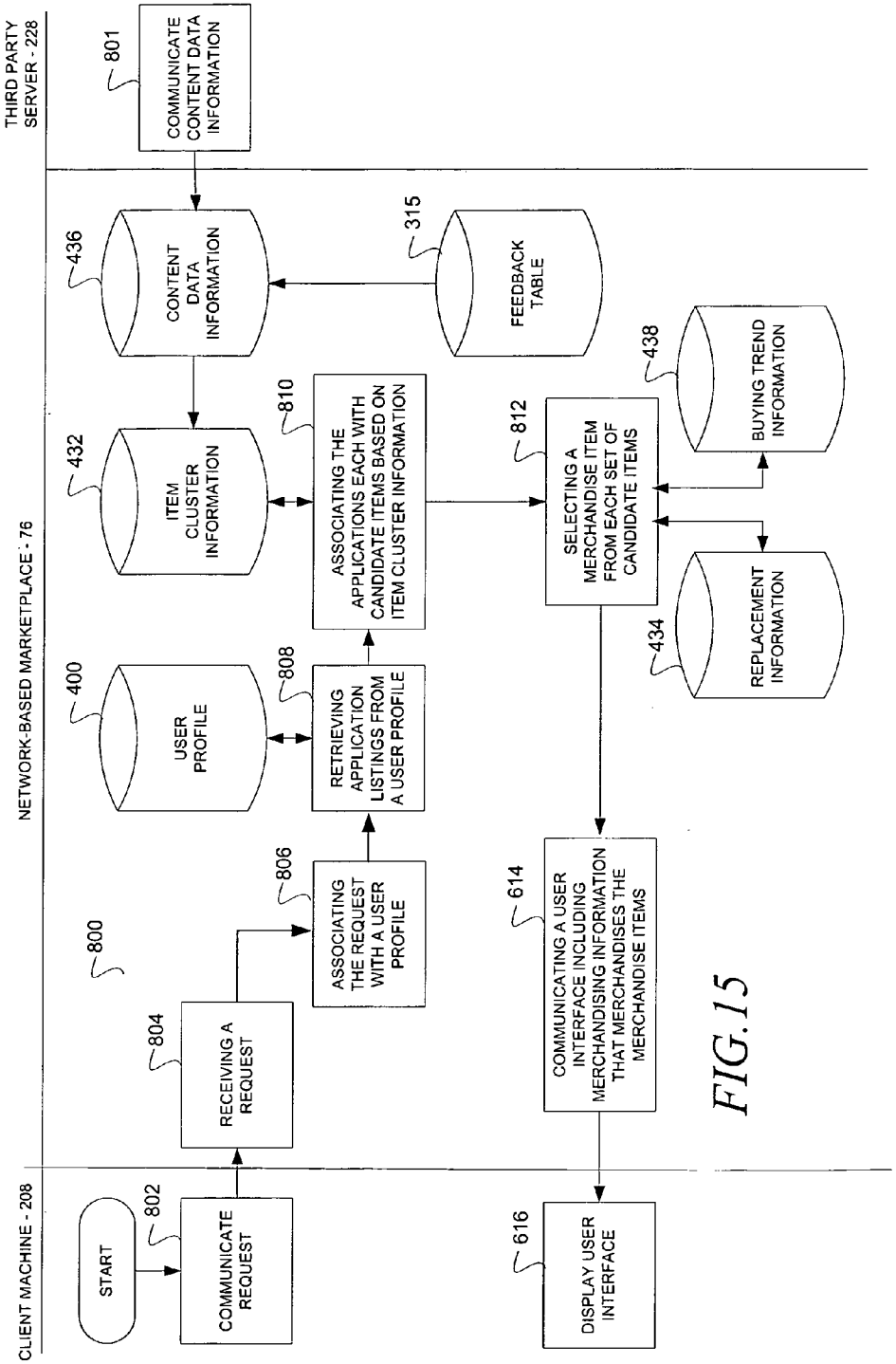
FIG. 15 is a flow chart illustrating a method to merchandise a product based on a likelihood of compatibility, according to an embodiment.

FIG. 15 is a flow chart illustrating a method 800, according to an embodiment, to merchandise a product based on a likelihood of a compatibility. Illustrated on the left is a client machine 208, illustrated on the right is a third party server 228 (e.g., commercial content provider) and illustrated in the middle is a network-based marketplace 76. The method 800 may commence at operation 801 or operation 802. For example, the method 800 may commence at operation 801 to generate item cluster information 432 that is utilized by the remaining operations of the method 800. The operation 801 has previously been described as operation 601 on FIG. 11.

At operation 802, the client machine 208 may communicate a request to the network-based marketplace 76. At operation 804, at the network-based marketplace 76, the receiving module 328 may receive the request, and at operation 806 the processing module 330 may associate the request with a user profile 400. For example, the processing module 330 may identify the request as originating with a user that has logged onto the network-based marketplace 76 and is communicating from a particular client machine 208. That is, the identity of the user may be identified based on the request. At operation 808, the processing module 330 may retrieve applications from the user profile 400. For example, the processing module 330 may retrieve application listings 415 including product identifiers 416 that identify the applications. In one embodiment the processing module 330 may retrieve a predetermined number of applications from the user profile 400 based on a predetermined number of applications and a probability 418 associated with each of the applications. For example, the processing module 330 may retrieve the three applications with the highest probabilities (e.g., the applications most likely to be associated with the user). In one embodiment, the processing module 330 may retrieve applications that exceed a predetermined probability up to the predetermined number of applications. At operation 810 the processing module 330 associates each application with a set of candidate items based on item cluster information 432. For example, the processing module 330 may utilize a cluster service that receives a product identifier 416 for the application, accesses the item cluster information 432 based on the product identifier 416 and returns a set of candidate items that are compatible with the application. For example, the cluster service may utilize the product identifier 416 of the application to access the cluster information 432 and retrieve product identifiers 416 for a plurality of candidate items that are compatible with the application. At operation 812, the processing module 330 may select a merchandise item for each set of candidate items. The processing module 330 may select each merchandise item based on buying trend information 438. For example, the processing module 330 may access the product rank 528 (FIG. 10C) in the buying trend product information 510 for each of the candidate items and select the candidate item with the lowest product rank 528. Accordingly, the processing module 330 may select a merchandise item with the strongest buying trend product information 510 from each set of candidate items. At operation 614, the communication module 332 may generate a user interface including the merchandising information featuring the selected merchandise items and, communicate the user interface to the client machine 208.

At operation 616, the client machine 208 may receive the user interface and display the user interface to the user. For example, FIG. 17 shows a user interface 880 that includes merchandising information featuring the selected merchandise items that are respectively compatible with different applications.

Other Embodiments

In another embodiment the processing module 330 may utilize replacement information 434 (FIG. 7D) rather than buying trend information 438 to select the item from the candidate items. To this end, the processing module 330 may select a merchandise item from the candidate items (as in operation 612) based on product replacement information 480 as previously described with respect to the selection of the second item in FIG. 11.

In another embodiment the communication module 332 may generate a message rather than a user interface. For example, the communication module 332 may generate a message including merchandising information and communicate the message to an application programming interface at another machine (e.g., server).

In another embodiment the network-based marketplace 76 may receive the content data information 436 from an internal data source rather than an external data source. For example, the network-based marketplace 76 may receive the content data information 436 from the feedback table 315 (FIG. 6A) that is local to the network-based marketplace 76. Merely for example, the feedback table 315 may include user comments that describe tires for a Toyota Tacoma Truck.

FIG. 16 is a diagram illustrating a user interface 870, according to an embodiment. The user interface 870 is shown to include a merchandising panel 872 that includes merchandising information that includes an item 874 in the form of "Good Year Tires," an item 876 in the form of an "Air Filter," and an item 878 in the form of an "Electronic Starter." The items 874, 876, and 878 are compatible with the same application, namely an "Audi 1."

FIG. 17 is a diagram illustrating a user interface 880, according to an embodiment. The user interface 880 is shown to include a merchandising panel 881 that includes merchandising information that includes an item 882 in the form of a "Printer XYZ," an item 884 in the form of a "Fax 123", and an item 886 in the form of "Scanner M14." The items 882, 884, and 886 are respectively compatible with different applications including a "Dell Latitude D620," an "Apple IMAC 4" and an "HP Compaq 6000."

Figure 18:
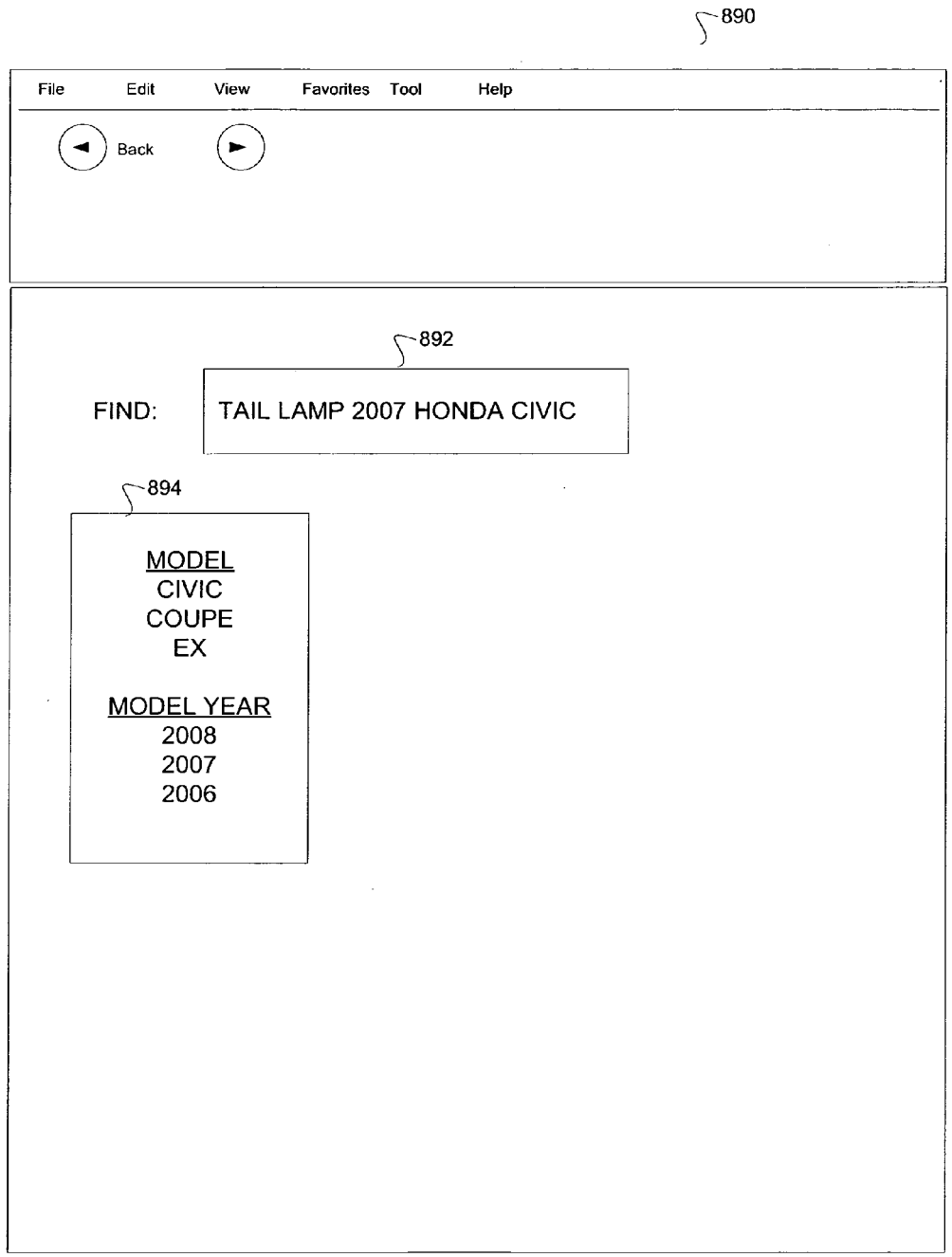

FIG. 18 is a diagram illustrating a user interface 890, according to an embodiment. The user interface 890 is shown to include an input box 892 that may receive a query including the keywords "TAIL LAMP 2007 HONDA CIVIC" and an application identifier panel 894 that may receive application parameters to further identify an application according to a model or model year. The network-based marketplace 76 may utilize the query to identify an application and a part that is compatible with the application. The network-based marketplace 76 may further utilize the application parameters to identify the application.

The above-described user interfaces are illustrated to include user interface elements and columns for display. However, it will be appreciated by those skilled in the art that the user interfaces may also be embodied as a machine interface (e.g., Standard Generalized Markup Language—SGML) including machine interface elements, an audio interface including audio interface elements, and a kinetic interface including kinetic interface elements.

In some embodiments, the methods described herein may be implemented in a distributed or non-distributed software application designed under a three-tier architecture paradigm, whereby the various components of computer code that implement these methods may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level and communicates the results of these logical/mathematical manipulations to the interface tier and/or to a backend, or storage, tier. These logical/mathematical manipulations may relate to certain business rules or processes that govern the software application as a whole. A third, storage, tier may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer-to-peer, or some other suitable configuration. Further, these three tiers may be distributed between multiple computer systems as various software components.

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component-oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs, and then compiled into one complete server, client, and/or peer software application. Further, these APIs may be able to communicate through various distributed programming protocols as distributed computing components.

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language by using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transport Control Protocol/Internet Protocol (TCP/IP) protocol stack model for defining the protocols used by a network to transmit data.

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), WAN, or some other suitable network. In some cases, "internet" refers to a network of networks. These networks may use a variety of protocols for the exchange of data, including the aforementioned TCP/IP, and additionally asynchronous transfer mode (ATM), system network architecture (SNA), SDI, or some other suitable protocol. These networks may be organized within a variety of topologies (e.g., a star topology) or structures.

Figure 19:
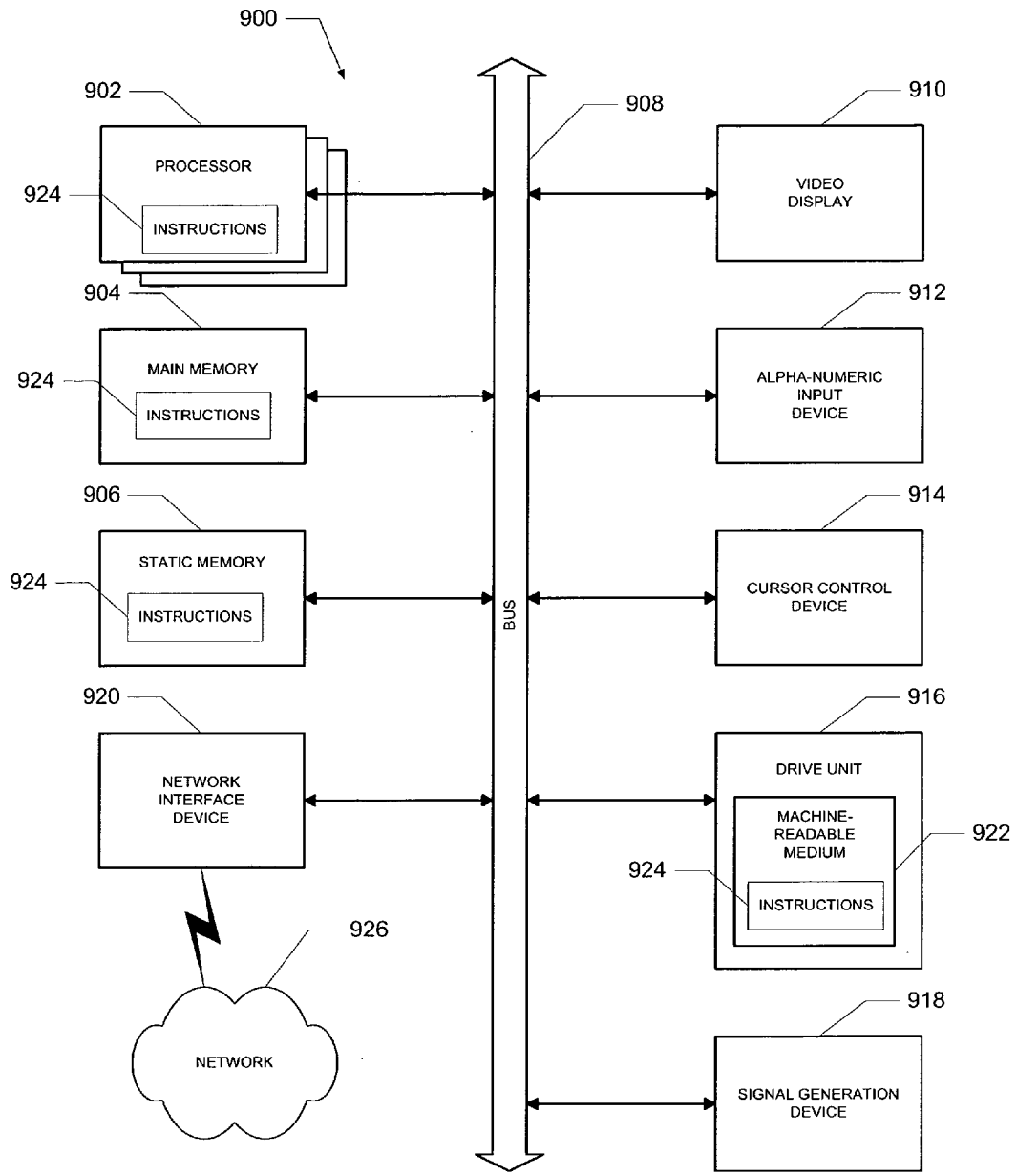
FIG. 19 shows a diagrammatic representation of a machine in the example form of a computer system, according to an example embodiment.

FIG. 19 shows a diagrammatic representation of a machine in the example form of a computer system 900 within which a set of instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes one or more processors 902 (e.g., a central processing unit (CPU), a graphics processing unit (GPU), or both), a main memory 904 and a static memory 906, which communicate with each other via a bus 908. The computer system 900 may further include a video display unit 910 (e.g. a liquid crystal display (LCD) or a cathode ray tube (CRT)). The computer system 900 also includes an input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions (e.g., software) 924 embodying any one or more of the methodologies or functions described herein. The instructions 924 may also reside, completely or at least partially, within the main memory 904, the static memory 906, and/or within the processor 902 during execution thereof by the computer system 900. The main memory 904 and the processor 902 also may constitute machine-readable media. The instructions 924 may further be transmitted or received over a network 926 via the network interface device 920.

Software applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present description. The term "machine-readable medium" shall accordingly be taken to include, but not be limited to, solid-state memories, optical media and magnetic media. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to merchandise a product based on compatibility are disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A method comprising:
   receiving a request over a network from a computer system;
   associating the request with a user profile associated with a user;
   retrieving an application listing from the user profile, the application listing describing a first item;
   associating the first item with a plurality of candidate items based on item cluster information, the item cluster information being generated based on content data information that is received from a content data provider, the associating being done by the use of one or more processors;
   selecting a second item from the plurality of candidate items, the second item being a component of the first item; and
   communicating, over the network, merchandising information that merchandizes the second item.

2. The method of claim 1, further including:
   receiving a query from the user that describes the first item and a part that is compatible with the first item;
   analyzing the query to identify the first item as an application that includes the part; and
   storing the first item in the user profile as the application listing.

3. The method of claim 1, further including:
   receiving a request associated with the first item;
   storing the first item in the user profile as the application listing that describes the first item.

4. The method of claim 1, further including:
   receiving a request associated with the second item;
   storing the second item in the user profile as a part listing that indicates the second item is a part of the first item; and
   storing the application listing in the user profile.

5. The method of claim 1, further including:
   receiving item information from the user that describes the first item and a part that is compatible with the first item;
   storing the item information in a listing that is utilized to offer the part for sale on a network-based marketplace;
   analyzing the item information to identify the first item as an application that includes the part;
   storing the application listing that describes the first item in the user profile that is associated with the user.

6. The method of claim 1, wherein the content data provider is selected from a group of content data providers consisting of a commercial content data provider from which content is purchased and a non-commercial content data provider from which content is freely obtained, wherein the non-commercial content data is retrieved from a network-based marketplace.

7. The method of claim 1, wherein the content data information describes assembling the first item by utilizing a plurality of parts that include the second item.

8. The method of claim 1, wherein the item cluster information is further generated based on receiving a plurality of queries that identify the first item and the second item.

9. The method of claim 1, wherein the item cluster information is further generated based on receiving item information that is used to generate a listing, wherein the item information identifies the first item and the second item.

10. The method of claim 1, wherein the selecting the second item from the plurality of candidate items is based on buying trend information that is generated based on receiving a plurality of queries from buyers that identify the second item.

11. The method of claim 10, wherein the selecting the second item from the plurality of candidate items is based on buying trend information that is generated based on purchases of the second item.

12. The method of claim 10, wherein the selecting the second item from the plurality of candidate: items is based on replacement information that is generated based on a replacement time associated with the second item.

13. A system comprising:
   a data processor;
   a data storage device in data communication with the data processor;
   a receiving module executable by the data processor to receive a request over a network from a computer system;
   a processing module executable by the data processor to associate the request with a user profile that is associated with a user, retrieve an application listing from the user profile that describes a first item and associate the first item with a plurality of candidate items based on item cluster information that is generated based on content data information that is received from a content data provider, the processing module to further select a second item from the plurality of candidate items, the second item a component of the first item; and
   a communication module executable by the data processor to communicate merchandising information over a network, the merchandising information to merchandize the second item.

14. The system of claim 13, wherein the receiving module receives a query from the user that describes the first item and a part that is compatible with the first item, the processing module to analyze the query to identify the first item as an application that includes the part and store the first item in the user profile as the application listing.

15. The system of claim 13, wherein the receiving module receives a request associated with the first item and wherein the processing module stores the first item in the user profile as the application listing.

16. The system of claim 13, wherein the receiving module receives a request associated with the second item and wherein the processing module stores the second item in the user profile as a part listing that indicates that second part is a part of the first item and stores the first item in the user profile as the application listing.

17. The system of claim 13, wherein the receiving module receives item information from the user that includes the first item and a part that is compatible with the first item, and the processing module stores the item information in a listing that is utilized to offer the part for sale on a network-based marketplace, and wherein the processing module analyzes the item information to identify the first item as an application that includes the part and wherein the processing module stores the first item in a user profile that is associated with the user as the application listing.

18. The system of claim 13, wherein the content data provider is selected from a group of content data providers consisting of a commercial content data provider from which content is purchased and a non-commercial content data provider from which content is freely obtained, wherein non-commercial content data is retrieved from a network-based marketplace.

19. A non-transitory machine-readable medium storing instructions that, when executed by at least one processor, cause the at least one processor to:
   receive a request over a network from a computer system;
   associate the request with a user profile associated with a user;
   retrieve an application listing from the user profile that describes a first item;
   associate the first item with a plurality of candidate items based on item cluster information, the item cluster information being generated based on content data information that is received from a content data provider;
   select a second item from the plurality of candidate items, the second item being a component of the first item; and
   communicate, over the network, merchandising information that merchandizes the second item.

20. A system comprising:
   a data processor;
   a data storage device in data communication with the data processor;
   a receiving module executable by the data processor to receive a request over a network from a computer system;
   a means for associating the request with a user profile that is associated with a user, retrieving an application listing from the user profile that describes a first item and associating the first item plurality of candidate items based on item cluster information that is generated based on content data information that is received from a content data provider, the means further for selecting a second item from the plurality of candidate items, the second item a component of the first item; and
   a communication module executable by the data processor to communicate merchandising information over a network, the merchandising information to merchandize the second item.

\* \* \* \* \*